United States Patent [19]

Barber

[11] Patent Number: 5,184,079
[45] Date of Patent: Feb. 2, 1993

[54] METHOD AND APPARATUS FOR CORRECTING DATA DEVELOPED FROM A WELL TOOL DISPOSED AT A DIP ANGLE IN A WELLBORE TO ELIMINATE THE EFFECTS OF THE DIP ANGLE ON THE DATA

[75] Inventor: Thomas D. Barber, Houston, Tex.
[73] Assignee: Schlumberger Technology Corporation, Houston, Tex.
[21] Appl. No.: 612,931
[22] Filed: Nov. 13, 1990
[51] Int. Cl.$^5$ ............... G01V 3/28; G01V 3/18; G01V 3/38
[52] U.S. Cl. ............... 324/339; 364/422
[58] Field of Search ............... 324/332, 333, 334, 336, 324/337, 338, 339, 340, 341, 342, 343; 364/422

[56] References Cited

U.S. PATENT DOCUMENTS

| | | |
|---|---|---|
| 2,582,314 | 1/1952 | Doll . |
| 2,582,315 | 1/1952 | Doll . |
| 2,790,138 | 4/1957 | Poupon . |
| 3,056,917 | 10/1962 | Tanguy . |
| 3,067,383 | 12/1962 | Tanguy . |
| 3,147,429 | 9/1964 | Moran . |
| 3,179,879 | 4/1965 | Tanguy . |
| 3,329,889 | 7/1967 | Tanguy . |
| 3,340,464 | 9/1967 | Gouilloud . |
| 3,453,530 | 7/1969 | Attali . |
| 4,471,436 | 9/1984 | Schaefer et al. . |
| 4,472,684 | 9/1984 | Schuster . |
| 4,513,376 | 4/1985 | Barber . |
| 4,818,946 | 4/1989 | Barber . |

OTHER PUBLICATIONS

"Theory of induction sonde in dipping beds", Geophysics, vol. 51, No. 3, Mar. 1960, pp. 800-809.
"Effects of Dipping Beds on the Response of Induction Tools", SPE 15488, New Orleans, Oct. 5-8, 1986.
"Strange Induction Logs—A Catalog of Environmental Effects", The Log Analyst, Jul.-Aug., 1988.
"Induction Log Deconvolution for Deviated Boreholes", SPWLA 23rd Annual Logging Symposium, Jul. 6-9, 1982, pp. 1-14.
"ELMOD-Putting Electromagnetic Modeling to Work to Improve Resistivity Log Interpretation", SPWLA 30th Annual Logging Symposium, Jun. 11-14, 1989, pp. 1-20.
"Introduction to the Phasor Dual Induction Tool", T. D. Barber, SPE, 1985, pp. 1699-1706.
"Induction Vertical Resolution Enhancement-Physics and Limitations", Thomas D. Barber, SPWLA 29th Annual Logging Symposium, Jun. 5-8, 1988, pp. 1-18.
"A New Look at Skin Effect", Stanley Gianzero & Barbara Anderson, The Log Analyst, Jan.-Feb., 1982, pp. 20-34.
SPE 19607, "Correcting the Induction Log for Dip Effect", exhibition of the Society of Petroleum Engineers, Oct. 8-11, 1989, pp. 371-380.
"Induction Stimulation, The Log Analysts' Perspective," by A. Fylling and J. Spurlin, presented at the 11th European Formation Evaluation Symposium, Sep. 14-16, 1988, Paper T.

Primary Examiner—Walter E. Snow
Attorney, Agent, or Firm—Henry N. Garrana; John H. Bouchard

[57] ABSTRACT

In a well logging truck computer which phroduces an induction log, a dip correction algorithm, stored in a memory of the computer, corrects an error introduced in the induction log by dip effect. The dip effect error is introduced into the induction log when an array induction tool is disposed in a deviated borehole at an apparent dip angle with respect to a formation having a plurality of bedding planes, and subsequently develops formation parameter data. This formation parameter data, which contains the dip effect error, is displayed on the induction log. The dip effect algorithm eliminates the dip effect error by multiplying or convolving inverse filters "h" as a function of dip angle "a" with a plurality of the formation parameter data "sigma(j−n)" to thereby produce a corresponding plurality of corrected formation parameter data "sigma$_f$", the corrected formation parameter data being reproduced on an induction log output record medium. The inverse filters "h" are computed using log response functions derived from simple dipping formation models.

14 Claims, 19 Drawing Sheets

METHOD AND APPARATUS FOR CORRECTING DATA DEVELOPED FROM A WELL TOOL DISPOSED AT A DIP ANGLE IN A WELLBORE TO ELIMINATE THE EFFECTS OF THE DIP ANGLE ON THE DATA

BACKGROUND OF THE INVENTION

The subject matter of the present invention relates to a well logging computer software which corrects an induction log for dip and well deviation effects.

It is important to the oil and gas industry to know the nature and characteristics of the various sub-surface formations penetrated by a borehole because the mere creation of a borehole (typically by drilling) usually does not provide sufficient information concerning the existence, depth location, quantity, etc., of oil and gas trapped in the formations. Various electrical techniques have been employed in the past to determine this information about the formations. One such technique commonly used is induction logging. Induction logging measures the resistivity (or its inverse, conductivity) of the formation by first inducing eddy currents to flow in the formations in response to an AC transmitter signal, and then measuring a phase component signal in a receiver signal generated by the presence of the eddy currents. Variations in the magnitude of the eddy currents in response to variations in formation conductivity are reflected as variations in the receiver signal. Thus in general, the magnitude of a phase component of the receiver signal, that component in-phase with the transmitter signal, is indicative of the conductivity of the formation.

U.S. Pat. Nos. 3,340,464; 3,147,429; 3,179,879; 3,056,917 and 4,472,684 are illustrative of typical prior-art well logging tools which utilize the basic principles of induction logging.

In each of the tools disclosed in these patents, a signal generator operates to produce an AC transmitter signal which is applied to a transmitter coil. The current in the transmitter coil induces in the formations a magnetic field, which, in turn, causes eddy currents to flow in the formations. Because of the presence of these formation currents, the magnetic field of the transmitter is coupled into a receiver coil R thereby generating a receiver signal (Logging tools having "a receiver coil" and "a transmitter coil" each of which may be comprised of one or more coils arranged in a predetermined geometrical fashion to obtain a desired response are commonly used). The receiver signal is then generally amplified and applied to one or more phase sensitive detectors (PSDs). Each PSD detects a phase component signal having the same phase as a phase reference signal which is also applied to the detector. The phase reference signal has a predetermined phase relationship to the current in the transmitter coil(s). The output of the PSD(s) may be further processed downhole, or may be sent uphole to surface equipment for processing or display to an operating engineer. Such processing may be accomplished using many well known techniques, including phasor deconvolution processing taught by U.S. Pat. No. 4,513,376 issued to T. Barber on Apr. 23, 1985; and U.S. Pat. No. 4,471,436 issued to R. Schaefer and T. Barber on Sept. 11, 1984. The disclosure of U.S. Pat. No. 4,471,436 is incorporated by reference into this specification. The disclosure of U.S. Pat. No. 4,513,376 is set forth below in APPENDIX A of this specification.

Since the earliest patents pertaining to focussed coil systems for induction logging (U.S. Pat. Nos. 2,582,314 and 2,582,315) the art has attempted to reduce the contribution to the tool response made by that part of the formation invaded by the drilling fluid ("invaded zone") and by formations above and below the region of interest. For example, U.S. Pat. No. 3,067,383, issued to D. R. Tanguy on Dec. 4, 1962 and incorporated herein by reference, discloses a sonde (hereinafter referred to as the Tanguy sonde) that has been very widely used in the industry and U.S. Pat. No. 2,790,138 issued to A. Poupon on Apr. 23, 1957 discloses the use of a plurality of electrically independent transmitter-receiver pairs arranged symmetrically about the same center point. The response of that tool is obtained by combining the response of the several electrically independent pairs, these pairs being arranged in such a manner that contributions to the tool response from formation regions lying above or below the outermost coils and from the formation region close to the borehole are reduced.

Other patents (such as U.S. Pat. No. 3,329,889 issued to D. R. Tanguy on Jul. 4, 1967 and U.S. Pat. No. 3,453,530 issued to G. Attali on Jul. 1, 1969), incorporated herein by reference, have described induction tools that combine two or more focussed arrays in one tool with the object of making measurements in radially different parts of the formation. The deep array in these tools is derived from the deep-reading Tanguy sonde, with a derivative array having several receivers and sharing common transmitters with the deep array forming an array with a medium depth of investigation. The deep and medium arrays from these references will be referred to as ID and IM, respectively.

Induction logs produced by the above referenced art are interpreted through algorithms and models that assume azimuthal symmetry about the borehole. In reality, either formation dip or well deviation often destroys this symmetry.

FIG. 1 shows the assumed symmetry for most induction modeling. The bedding planes are perpendicular to the axis of the induction sonde, and the induced current in the formation does not cross any of the bed boundaries.

FIG. 2 shows the dip case. When the borehole, and thus the induction sonde, is not perpendicular to the bedding planes, the formation currents are forced to cross the bed boundaries. The response of the induction tool to the formation layers in the presence of dip has been studied in the literature. [1,2,3]

In FIG. 2a, the angle between the borehole and a line perpendicular to the bedding planes is called apparent dip, and can be caused by dip, well deviation, or a combination of the two. All further references to dip will imply apparent dip.

FIG. 3 shows the effect of dip on the deep induction array (ID) with traditional processing (ILD log) in a 50:1 contrast resistive bed. The logs do not show much change in the maximum resistivity level in the resistive bed with increasing dip because the large error is dominated by shoulder effect (shoulder effect refers to the tendency of induction arrays to include beds above and below the zone of interest into the measurement. This leads to measurements that are in error in resistive beds). The effect of apparent dip on logs with other environmental effects corrected (such as Phasor logs) is different from the traditional logs.

FIG. 4 shows the deep induction array (ID) processed using the Phasor method (deep induction array Phasor, or IDPH).[3] Here the zero-dip shoulder effect has been corrected, and the dip-induced shoulder effect error increases with increasing dip. The apparent widening of the bed is just the geometrical effect of the longer path through the bed as dip increases. The effect on the medium induction array (IM) is similar, but is complicated by the asymmetry of the array.[2,3]

Various authors have reported methods for correcting induction logs for dip effect. Shen and Hardman[1] published charts analogous to the Thin Bed charts to correct ID and IM with traditional processing at various apparent dip angles. Howell and Fisher[4] reported an inverse filter method for ID which corrected for dip, but which did not separate out other environmental effects such as shoulder effect and invasion effect. This required a plethora of filters, one for every conceivable combination of shoulder-bed-contrast invasion, contrast diameter of invasion, and dip angle. Another method, iterative inversion through forward modeling, has been used to correct for dip effect in the North Sea.[5,6] This method yields accurate results, but involves many hours of computer time and considerable involvement of the log analyst.

SUMMARY OF THE INVENTION

It is therefore a primary object of the invention to provide a novel method of correcting the measurements of formation conductivity as made by an induction tool in the presence of apparent dip to provide an estimate of formation conductivity that would be made in the absence of apparent dip and for producing an output record medium presenting the corrected measurements of formation conductivity.

It is a further object of the present invention to develop a correction algorithm, for use in a well logging truck computer, which algorithm produces a correct curve shape and resistivity reading for an induction log when a tool is disposed in resistive beds with a dip angle between 0 and 70 degrees, but which does not attempt to reduce the apparent thickening of resistive beds and to produce an output record medium which reflects the corrected curve shape and resistivity reading.

It is a further object of the present invention to develop a correction algorithm for use in a well logging truck computer and, using the correction algorithm in the computer, to produce an output record medium which reflects a corrected curve shape, the computer receiving a plurality of formation parameter data "sigma(j−n)" and, using the correction algorithm, produces a correct curve shape of formation parameters "sigma$_F$" for an induction log when a tool is disposed at an apparent dip angle in resistive beds having a plurality of bedding planes, the correction algorithm being mathematically presented in equation 13, the correction algorithm developing a filter h(a) for each dip angle "a", such that, when the filter "h(a)" is multiplied by or convolved with a particular formation parameter "sigma(j−n)", a corrected formation parameter "sigma$_F$" is produced, the corrected formation parameter being an estimate of a formation parameter, such as conductivity, that is made in the absence of apparent dip.

In accordance with these and other objects of the present invention, phasor logs are corrected for all other environmental effects at zero dip by assuming that the various effects (shoulder effect, borehole effect, and invasion effects) are separable, and can be corrected in sequence. Although dip is most probably not fully separable from other environmental effects, there are a number of significant examples where it should be nearly so, such as in wells drilled with oil-based mud. An algorithm based on the assumption of separability is outlined in the following sections.

Determining the true formation resistivity Rt from induction logs in the presence of either dip or well deviation is complicated by the distortions in the log introduced as the apparent dip angle increases. This effect is well documented. The effect on traditional ID logs is to make shoulder effect somewhat worse, causing resistive beds to read even lower. The effect of dip on Phasor induction logs is more readily apparent, since the shoulder effect has been removed. As the dip angle increases, the Phasor ID logs read more nearly like the traditional ID log.

A correction algorithm has been developed which improves the accuracy of the readings in the resistive bed, but which does not attempt to reduce the apparent thickening of said resistive beds. The charge-buildup effects which lead to this apparent thickening are quite nonlinear, depending strongly on the conductivity contrast across the boundary. The increase in shoulder effect with dip angle, however, is approximately linear in both contrast and conductivity magnitude. This near-linearity allows a correction algorithm to be developed using the inverse-filter method. The algorithm as currently developed gives greatly improved resistivity accuracy in resistive beds at apparent dip angles up to 70 degrees. Tests on a large number of computed logs confirm the apparent linearity of the main part of the dip effect.

In summary, however, from one of its broad aspects, the invention contemplates a method for correcting induction logs for the errors introduced when the induction sonde is not perpendicular to the formation bedding planes. This dip correction method uses an inverse filter derived from response functions that describe mathematically the response of the induction tool as it crosses the bedding planes at an angle other than perpendicular. At a given fixed angle, this response function is unique. The inverse filter is computed to correct the distortions in the response introduced by the apparent dip angle and to return to a response that would have been obtained if the induction sonde, had been disposed perpendicular to the bedding planes. In a preferred embodiment of the present invention, the filters are derived from response functions computed after the logs have been corrected to the true bed thickness (TBT) reference frame to remove the geometrical effects of a longer path through the formation when the borehole is not perpendicular to the bedding planes. Such filters are computed for angles every 10 degrees and the correct result is obtained from interpolation between between the defined filter angles. Preferred details and structures are hereinafter more particularly described. In a preferred embodiment, the explicit algorithm for doing dip correction with filters derived from step-profiles involves several steps. These are:

step (1): Determine an apparent dip angle from dip and deviation using equation (8), the dip and deviation being determined from measurements external to the induction process; and identify the two nearest defined dip angles (a1 and a2) which provide a bound around the apparent dip angle (a1 < apparent dip angle < a2);

step (2): Convert the raw, calibrated induction channel data to True Bed Thickness (TBT) format to remove geometric distortion using equation (10) and resample the converted data on a six-inch interval in TBT mode using equation (11);

step (3): Process the converted, resampled induction channel data in TBT format using the phasor algorithm set forth in U.S. Pat. No. 4,513,376 to Barber, set forth below in appendix A, to produce induction deep phasor (IDPH) and induction medium phasor (IMPH) signals $\sigma CDPH_{TBT}$ and $\sigma CMPH_{TBT}$, respectively;

step (4): Using equation 13, process each of the resulting induction deep phasor (IDPH) and induction medium phasor (IMPH) signals $\sigma CDPH_{TBT}$ and $\sigma CMPH_{TBT}$ of step (3) with two filters h(a1) and h(a2), where filter h(a1) is a function of one of the two nearest defined dip angles a1 of step (1) and filter h(a2) is a function of the other of the two nearest defined dip angles a2 of step (1), to thereby produce two values "sigma$_F$" for each of the signals $\sigma CDPH_{TBT}$ and $\sigma CMPH_{TBT}$, a filter h(a) at a given dip angle 'a' being derived through equation (5a) using a function g(z) derived from equation (B) at the given angle 'a', the two values "sigma$_F$" being formation parameters (such as conductivity) associated with a formation traversed by a borehole at the two nearest defined dip angles;

step (5): given the two values "sigma$_F$" step (4) and the two corresponding respective nearest defined dip angles a1 and a2 of step (1), and given the apparent dip angle determined in step (1), interpolate to determine a new value "sigma$_F$" corresponding to the apparent dip angle;

step (6): Do a "skin effect" correction on the new value "sigma$_F$" of step (5) using equation (21); and step (7): If required, convert back from TBT format to borehole depth for comparison to field log data.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein.

DESCRIPTION OF THE PREFERRED EMBODIMENT

Figure 1:
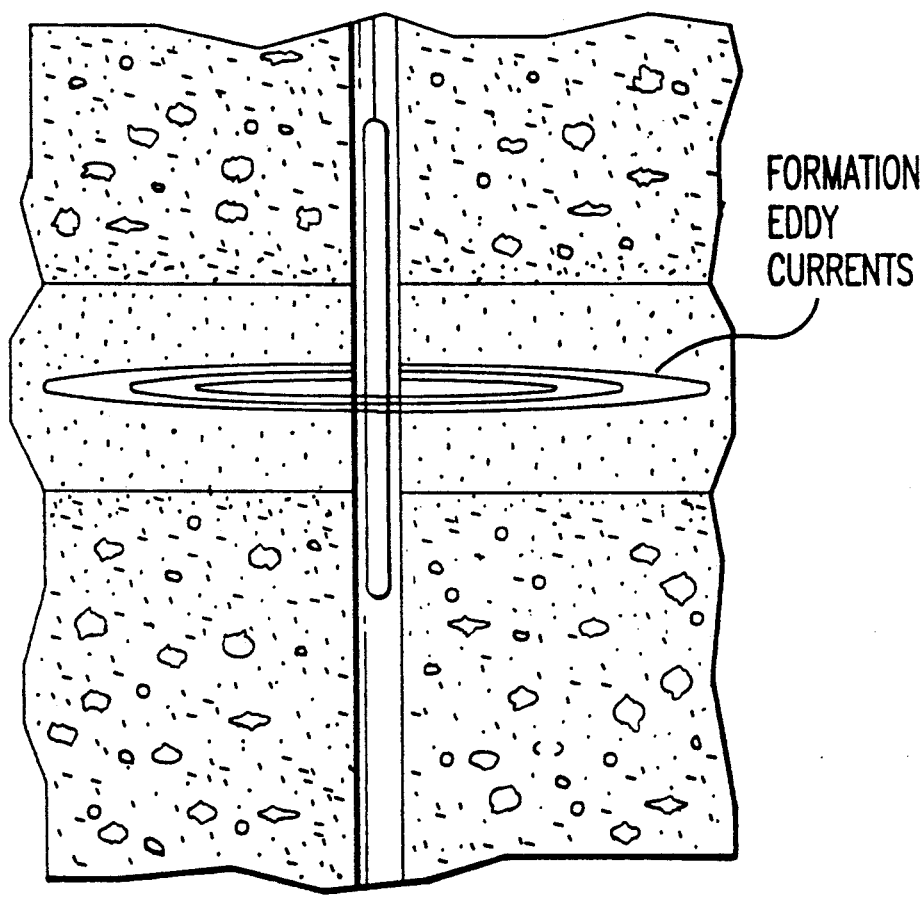
FIG. 1 illustrates Formation current density symmetry at zero dip.
Figure 2:
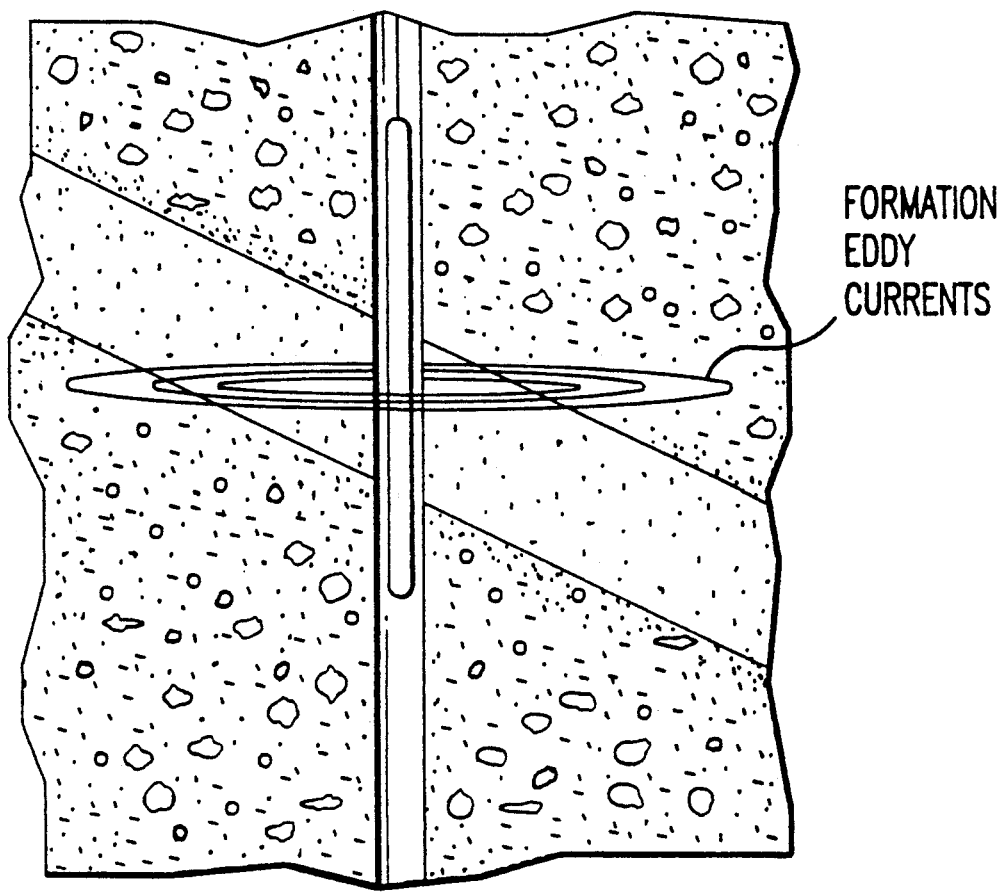
FIG. 2 formation current density crossing bed boundaries in a dipping formation.
Figure 2A:
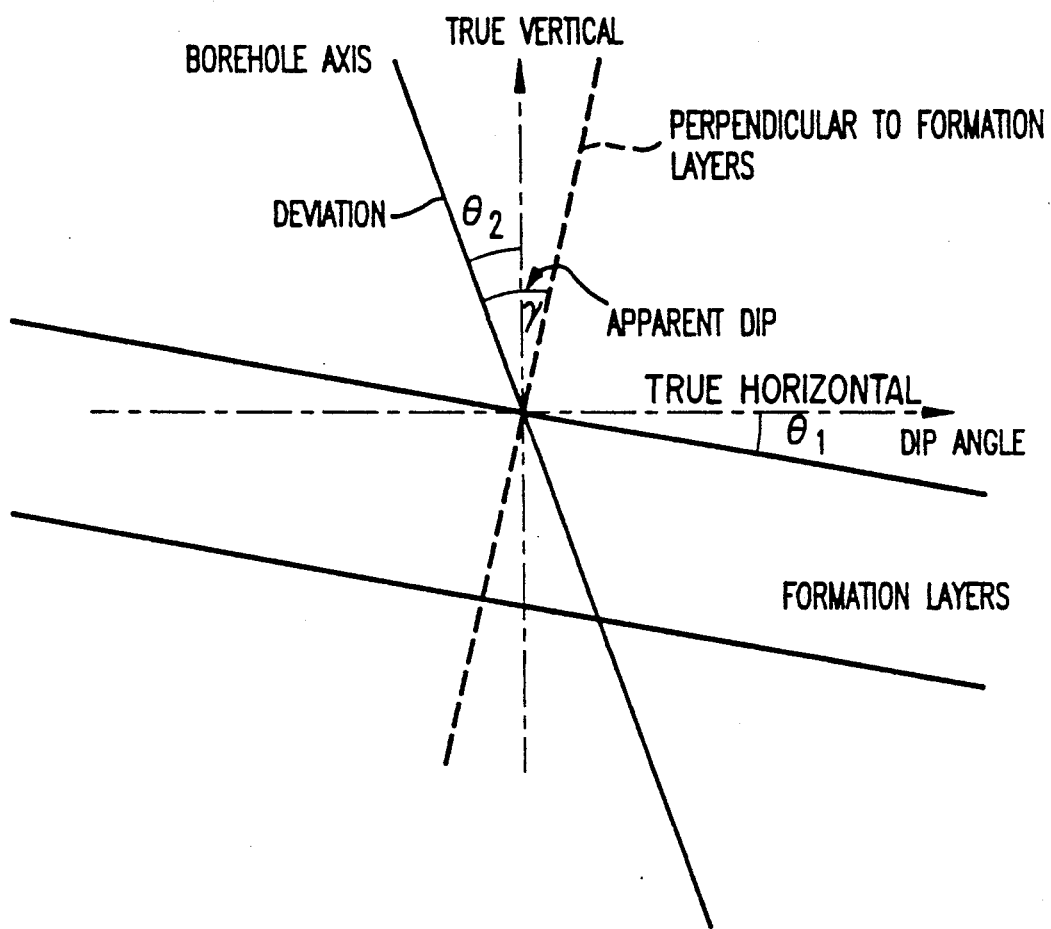
FIG. 2a illustrates the geometry of dip and deviation showing apparent dip.
Figure 3:
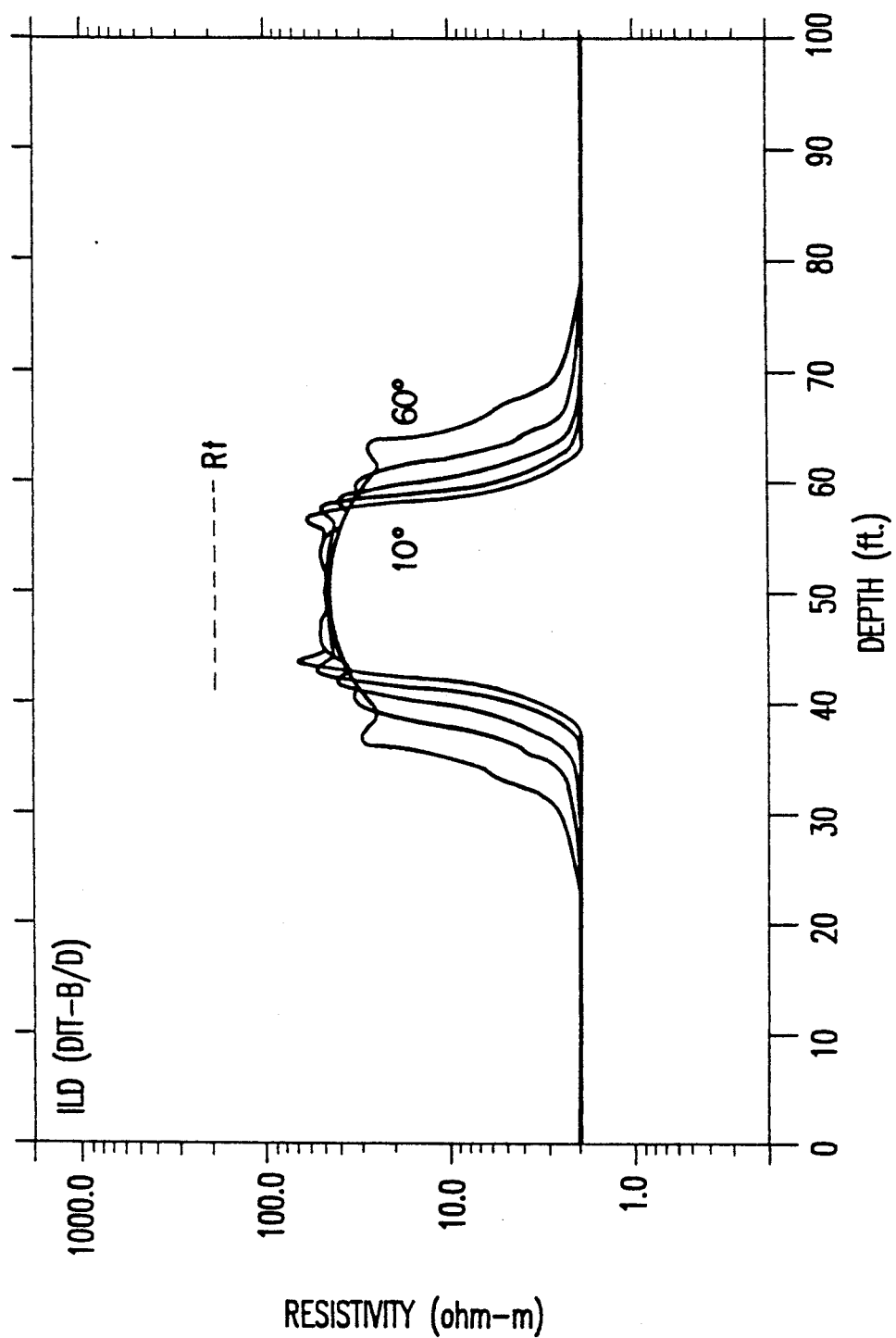
FIG. 3 illustrates ID Logs in a 20 ft, 100:1 contrast resistive bed as a function of dip angle.

The invention of this specification is a Dip Correction Algorithm adapted to be used in association with a well logging truck computer which produces an induction log, for correcting an error introduced in the induction log by dip effect by means of inverse filters which are computed using log response functions derived from simple dipping formation models.

The character of induction logs has long been described in terms of the response function of the induction logging tool. Doll first described the response function at zero conductivity by solving the static electromagnetic field problem. Doll termed the response function the "geometrical factor". According to Doll, the response function has the character of a set of weights by which one can determine what fraction of the total signal at a single measure station in the log came from a particular element of formation. This has the mathematical form of a convolution such that the measured conductivity $\sigma_m$ can be related to the formation conductivity distribution $\sigma_F$ through the response function $g_v$ by the convolution operation $$\sigma_m = \int_{-\infty}^{\infty} g_v(z - z')\sigma_F(z')dz' \quad (A)$$

Other workers (Gianzero and Anderson)[2, 12] have extended the concept of the response function to more complicated formation geometries, such as finite conductivity, layering, or azimuthally symmetrical. In formations that violate this symmetry, such as a formation with dipping beds, no function that has the above relation between the formation conductivity distribution and the measured signal can be derived from the differential equations defining the problem.

Although there is no $g_v$ for these formations that can be derived from the differential equations, methods exist that compute the measured signal from the formation conductivity distribution [1], [2].

The new technique introduced here involves using forward models of the induction process to compute the response in a simple step-profile formation at a given dip angle. The response function which transformed the formation step into the log can be determined by taking the derivative $$g(z) = a \frac{d\sigma_m}{dz},\qquad (B)$$

where a is selected so that $$\int_{-\infty}^{\infty} g_s(z)dz = 1 \qquad (C)$$

The response function derived by the use of equation (B) satisfies Equation (A), so that it can then be used to derive an inverse filter for the distortions produced by the dip using standard methods.

However, the response function (and its corresponding inverse filter) is perfectly mathematically valid only for the step profile case. The technique must be tested in a series of complicated formations and its validity in other formations proved. This was done in development of the dip correction algorithm.

Since the inverse filter derived by the above method is valid only for the dip angle for which it was computed, a method of allowing for other angles was devised. By testing, it was found that by developing filters for angles every 10 degrees and interpolating between the outputs of the filter angles nearest the actual angle, sufficient accuracy was obtained for angles up to 70 degrees.

To summarize, the essence of the subject invention is the development of a method to find a response function in non-azimuthally symmetrical formation geometries, and the application of that method to develop a correction for the errors introduced into the induction log by dip effect.

DETAILED DESCRIPTION OF THE PREFERRED EMBODIMENT

Figure 4:
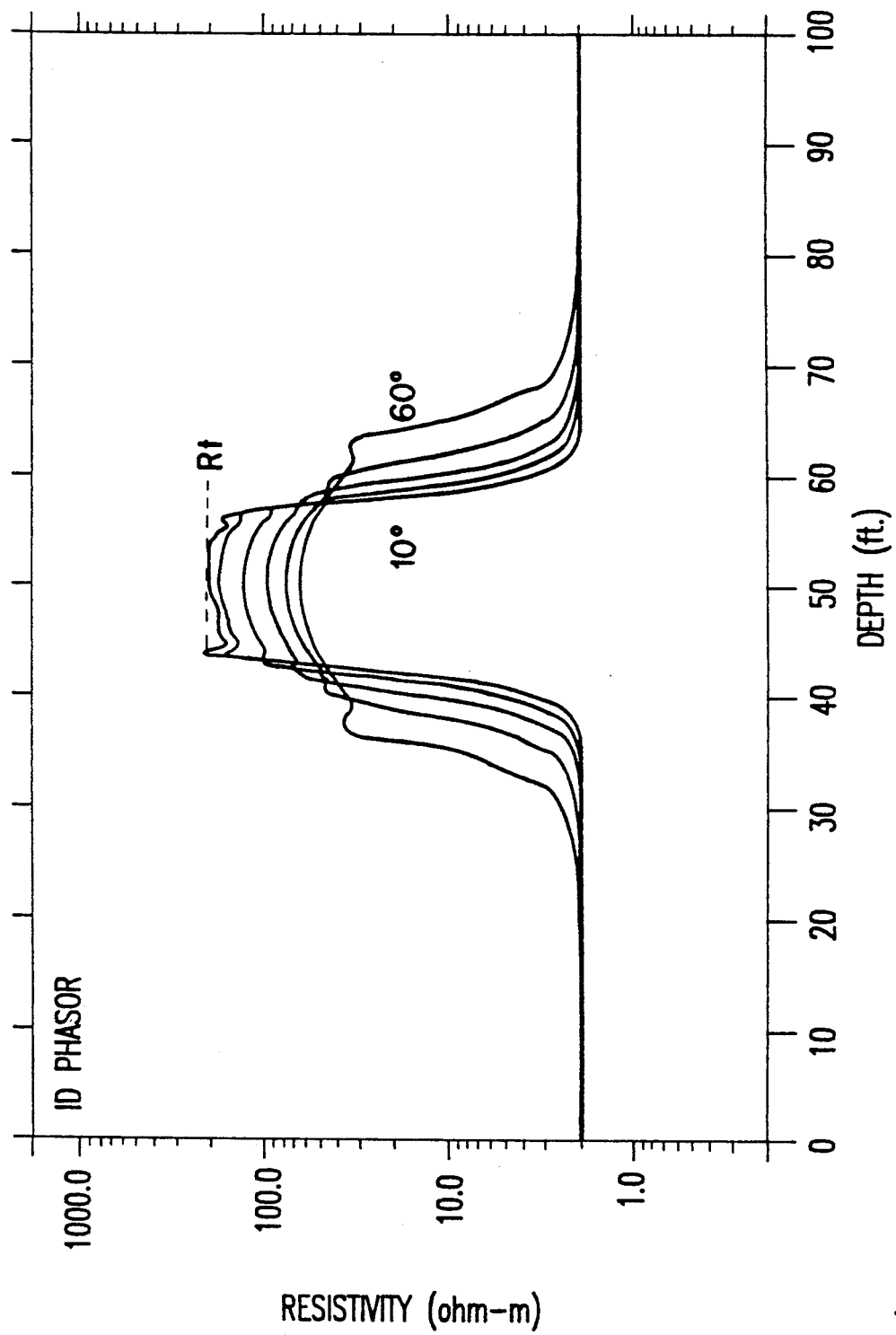
FIG. 4 illustrates ID Phasor logs in a 20 ft, 100:1 contrast resistive bed as a function of dip angle.
Figure 4A:
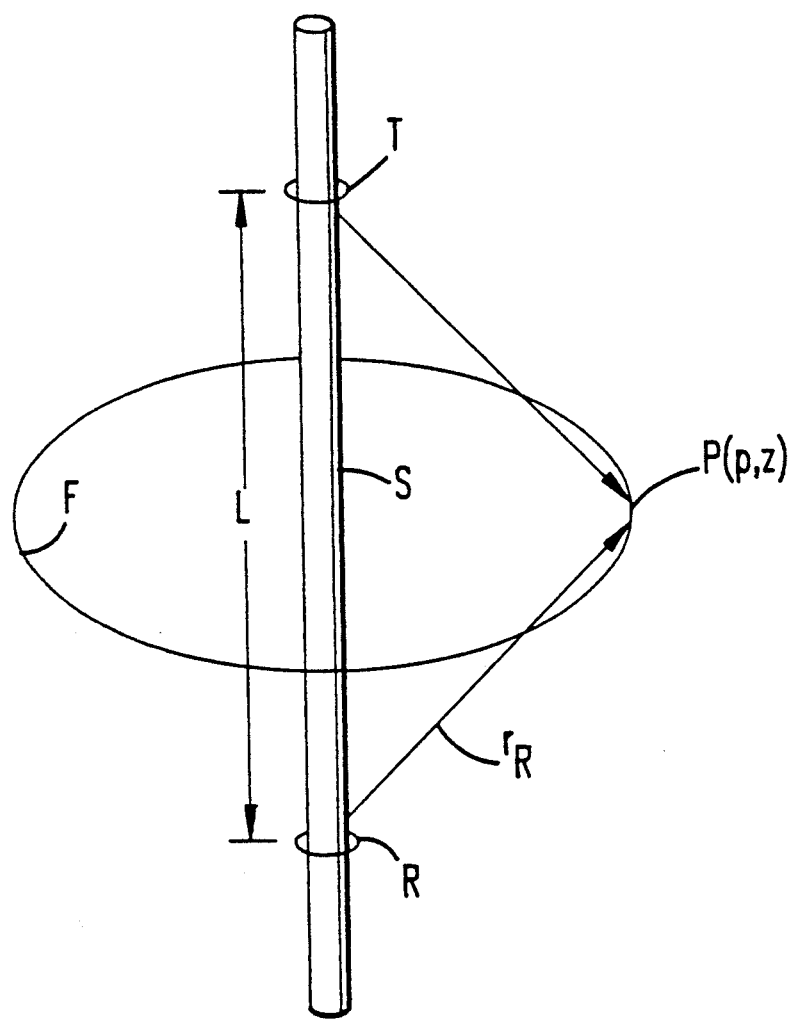
FIG. 4a illustrates Basic induction geometry.

Referring now to FIG. 4a, a transmitter coil T and a receiver coil R are mounted on a support member S having a transmitter-receiver spacing L for investigating a formation F. The transmitter current induces eddy currents in the formation, one loop of which is shown diagrammatically as a circle at a point P having cylindrical coordinates P(rho,z) with a distance between the point P and transmitter or receiver being shown as $r_T$ or $r_R$ respectively.

The response of the induction tool to various parts of the formation is well known. Specifically, the induction signal received by the receiver coil(s) from the formation is simply the volume integral of all of the formation current density induced by the electromagnetic induction signal being transmitted into the formation by the transmitter(s). For a two-coil array at the zero conductivity limit this volume integral is easily interpreted.

With the coils arranged as shown in FIG. 4a, for a formation having uniform conductivity, the total voltage in the receiver coil induced by the entire formation conductivity is represented by a of convolution or mapping integral:

$$V_R = K\sigma_F \int_{-\infty}^{\infty} \int_0^{\infty} \frac{L\rho^3}{2r_T^3 r_R^3} d\rho\, dz. \qquad (1)$$

where the integrand:

$$gGF(\rho,z) = \frac{L\rho^3}{2r_T^3 r_R^3} \qquad (2)$$

called the geometrical factor or response function, describes the contribution to the total receiver coil voltage from the point P in the formation. The instrument constant K takes into account the size of the coils, the number of turns and spacing as is well known. For an array with more than two coils, the total response is a superposition of the possible individual coil-pair responses.

Integrating the response function gGF(ρ,z) with respect to r yields the response of the array to the bedding layers of the earth formation, known as the vertical response function or geometrical factor g(z). The response of an induction sonde to an arbitrary formation conductivity distribution can be written as the convolution of the formation conductivity distribution with some function g which may change with sonde position in the formation. However, in general, there will be some apparent response function which satisfies the following equation:

$$\sigma_A(z) = \int_{-\infty}^{\infty} g_A(z - z')\sigma_F(z')dz' \qquad (3)$$

A typical processing method (hereinafter referring to as "phasor processing"), which is used to filter the receiver signals to produce a measurement of a formation characteristic, is well disclosed in U.S. Pat. No. 4,513,376 to Barber, the disclosure of which is set forth below in APPENDIX A of this specification. This processing method reduces the effects of variations in the induction tool response with formation conductivity (skin effect). However, this process assumes a perpendicular angle between a longitudinal axis of the sonde and bedding planes. The phasor processing is used on the voltage measurements obtained by the receivers of the induction logging tool or sonde. These voltage measurements are representative of the conductivity of the formation based on the well known geometrical factor theory.

In FIG. 4a, the induced current J(rho,z) induced at point P(rho,z) in the formation is the result of a transmitter current J. This transmitter current induces an eddy current distribution in the surrounding formation which is related to the transmitter position and the formation conductivity distribution. The current J(rho,z) induced and flowing in the formation is computed by solving Maxwell's Equations for the appropriate boundary conditions. Deriving an analytic expression for g in the case of dip is complicated by the layering complexity that may be encountered in an actual subsurface formation. An approximate method of determining g in a formation of arbitrary complexity will be developed below.

Figure 4B:
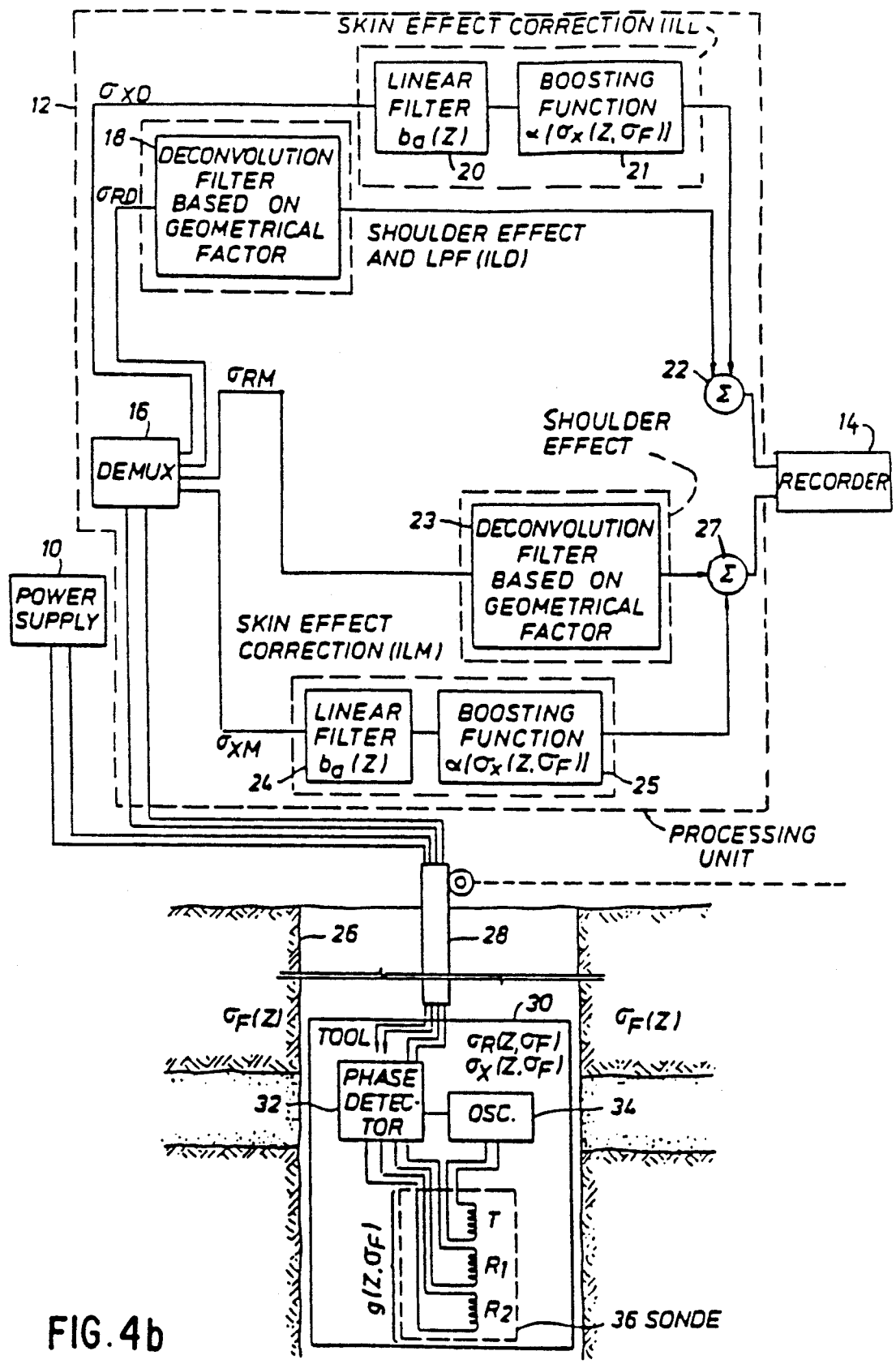
FIG. 4b illustrates a phasor logging system block diagram.

Turning now to FIG. 4b, a block diagram illustration of an induction logging system in accordance with the present invention, which implements phasor processing, is illustrated. A similar block diagram is illustrated in U.S. Pat. Nos. 4,818,946 and 4,513,376 to Barber U.S. Pat. No. 4,513,376 is set forth below in APPENDIX A and U.S. Pat. No. 4,818,946 is set forth below in APPENDIX B. In FIG. 4b, an induction logging tool 30 is shown suspended in a borehole 26 by a wireline cable 28. The induction tool 30 is powered by power supply 10 and includes a sonde 36 with at least one transmitter T and at least one receiver array R, (for purposes of illustration, two simple one-receiver-coil arrays are shown, however, multiple coil arrays may be used as is known in the art). Tool 30 also includes phase sensitive detectors 32 which respond to signals from the transmitter oscillator 34 and the received signal from the receivers R1 and R2 to generate in-phase (sigma R(z) sigma F) and quadrature-phase (sigma X(z) sigma F) components for each log measurement. A processing unit 12, which may be a general purpose programmed computer, is disposed at a well surface and is connected to the tool 30, the processing unit 12 processing the induction measurements obtained by the tool 30. A demux 16 separates the components of each log measurement received from tool 30. The processing unit 12 is more fully described in U.S. Pat. No. 4,818,946, set forth below in appendix B by reference.

Figure 4C:
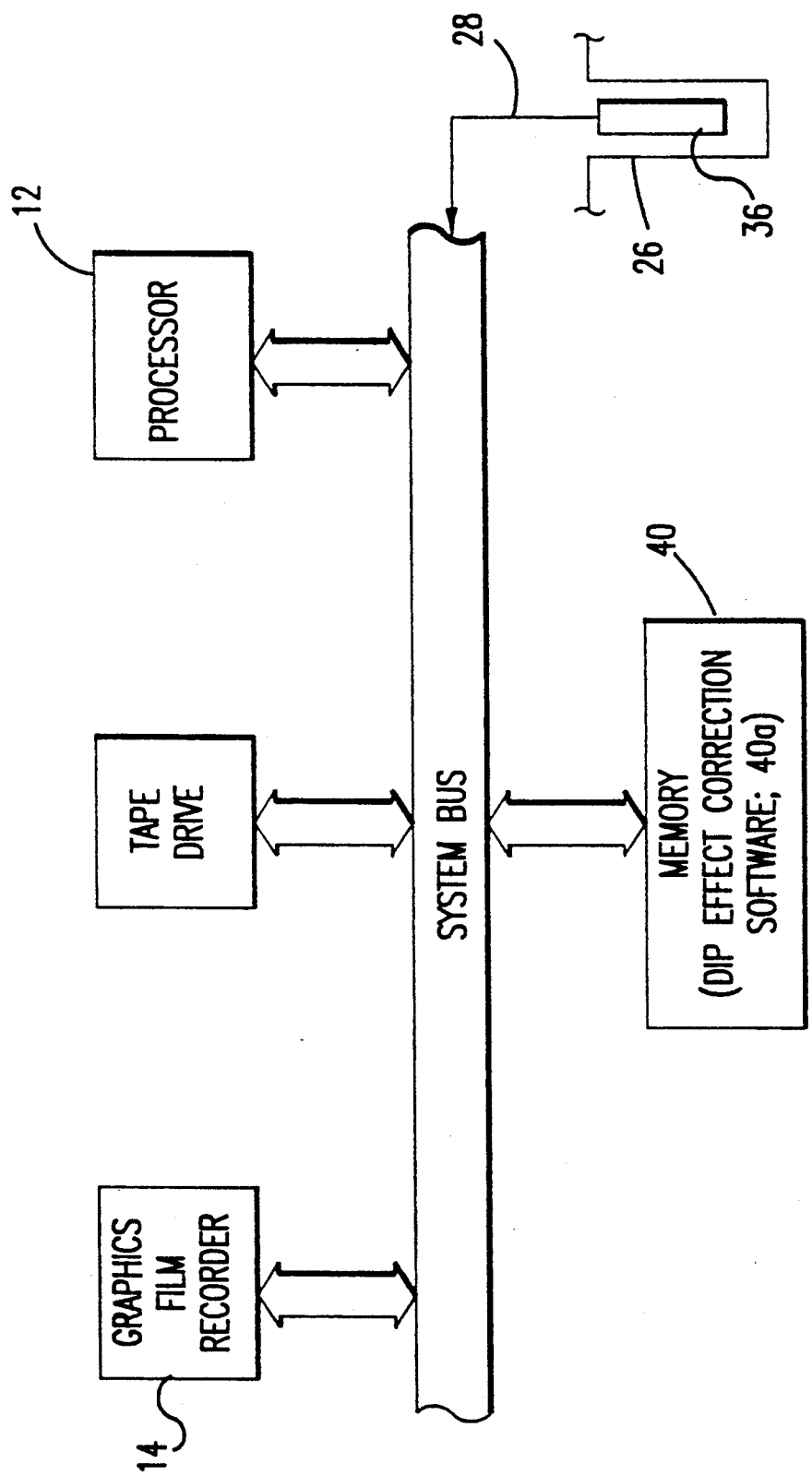
FIG. 4c illustrates a basic block diagram of a well-logging truck computer.

In FIG. 4c, a simple construction of the well-logging truck computer is illustrated. The computer comprises the processor 12 of FIG. 4b, a tape drive, and main memory 40. The main memory 40 stores a set of software termed the "Dip Effect Correction Software" 40a of the present invention. The computer of FIG. 4c may be any typical computer, such as one of the following computer systems manufactured by the Digital Equipment Corporation (DEC), Maynard, Mass.: (1) DEC VAX 6430, (2) DEC PDP-11, or (3) DEC Vaxstation 3100.

Referring to FIGS. 5-11, in accordance with the preferred embodiment of the present invention, a general discussion of the effects of apparent dip or well deviation on an induction log and the development of a correction is set forth in the following paragraphs.

STUDY OF THE EFFECT

Figure 5:
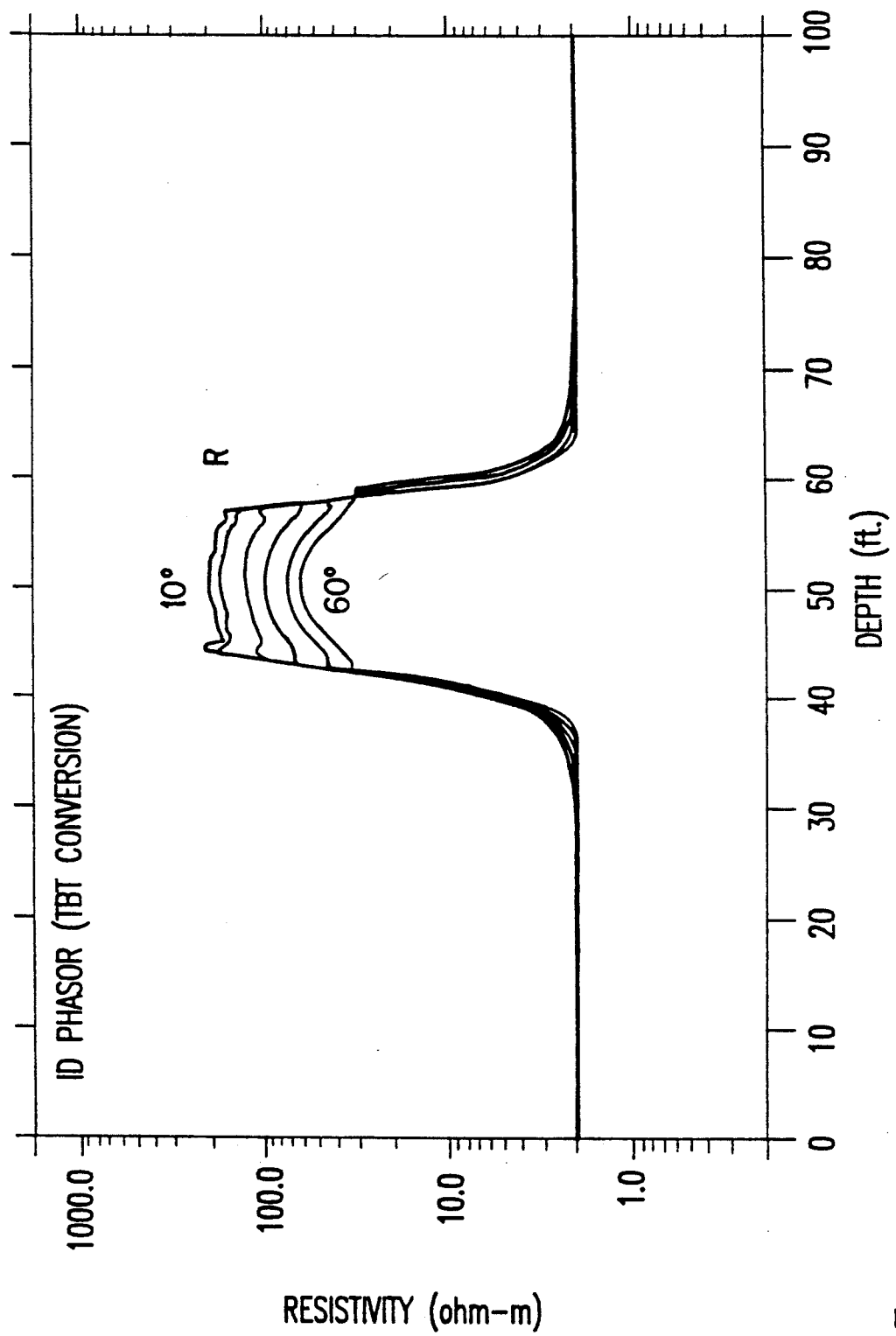
FIG. 5 illustrates the case of FIG. 4 in TBT format.

In order to make a thorough study of the effects of apparent dip on the induction log, a code developed by Anderson et al.[2] was used to compute a series log over a wide range of formation resistivities at many apparent dip angles. Beginning with the cases shown in FIG. 4, the geometric effects of dip can be removed by converting the logs to the true bed thickness (TBT) reference frame in depth. Logs are converted to the TBT frame by projecting the log along a line perpendicular to the bedding planes, i.e., by multiplying a given depth by cos $\theta$ (where $\theta$ is the dip angle), and resampling on 6 in. depth intervals along the perpendicular line. This process does not change the resistivity readings, but removes the effect of the longer path through the bed with increasing dip in FIG. 4. The results are shown in FIG. 5.

After the geometrical effects are removed, another effect becomes apparent. This is the apparent "widening" of the resistive bed. In more complicated examples, the resistive beds appear wider and the conductive beds appear narrower. This is due to the distortions in the eddy currents as they are forced to cross the boundary.

Figure 6:
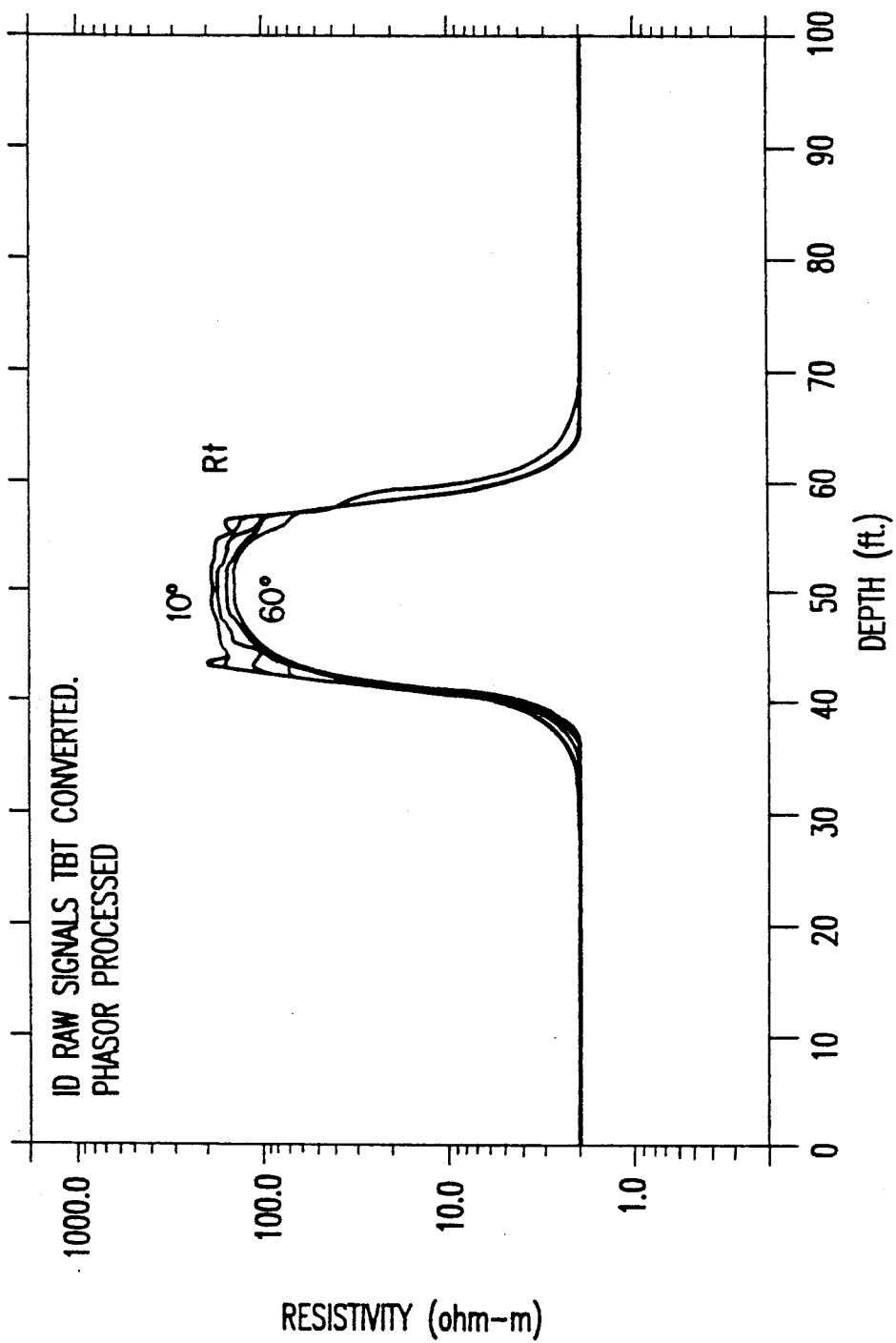
FIG. 6 illustrates the logs of FIG. 4 with raw, calibrated data converted to TBT reference, then phasor processed.

The reason that a simple TBT conversion does not correct Phasor logs is that the Phasor shoulder effect correction is based on a zero dip model. It is worthwhile to see what happens when the raw data are transformed to the TBT frame, then processed for shoulder effect. The same set of cases from FIGS. 4 and 5 is shown in FIG. 6. The error in center-bed resistivity is considerably reduced, although not entirely eliminated. The shape of the resistivity curves in the resistive bed remains. However, since the error is considerably reduced from the original logs made in the borehole depth reference frame, this was taken as a starting point to develop a correction algorithm.

Development of such an algorithm begins with a study of the effect in a series of simple cases. The simplest case is the step profile. By computing the conductivity log in a step profile, then taking the derivative of the conductivity and normalizing, the apparent response function in that profile can be determined. The response function can then be analyzed to study dip effect. By doing this for several step magnitudes and background conductivity levels, the sensitivity of dip effect to these variables can be determined.

Figure 7:
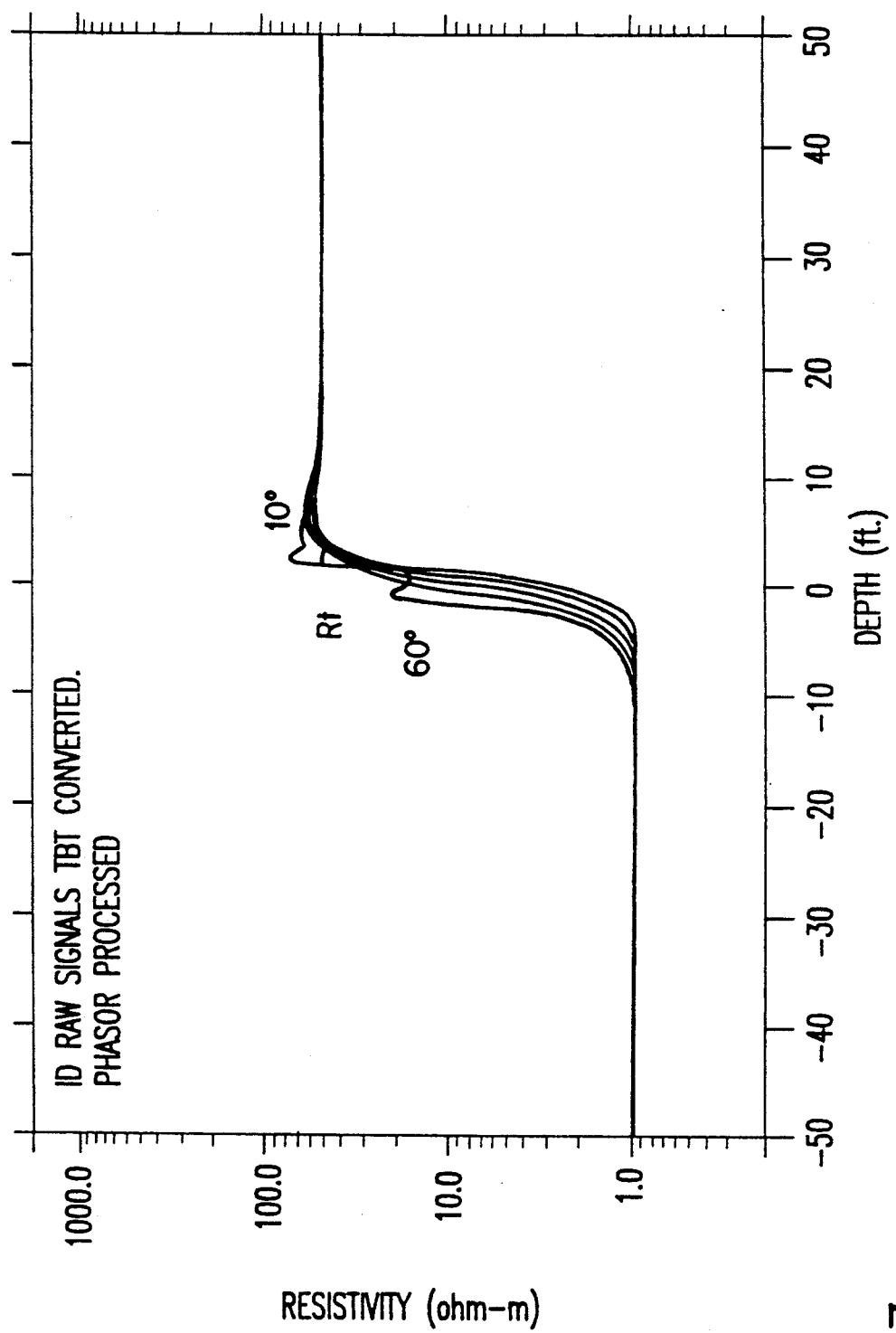
FIG. 7 illustrates the logs of a 50:1 contrast step profile at various dip angles.

FIG. 7 shows a 1000 mS/m-20 mS/m step for ID Phasor as a function of dip angle. The apparent position of the boundary moves to the left (into the conductive bed) as the dip angle increases. From this behavior, it is easy to see how the apparent thickening of the resistive beds occurs. By differentiating the curves of FIG. 7, then normalizing, the apparent response functions can be derived. These are shown in FIG. 8.

Figure 8:
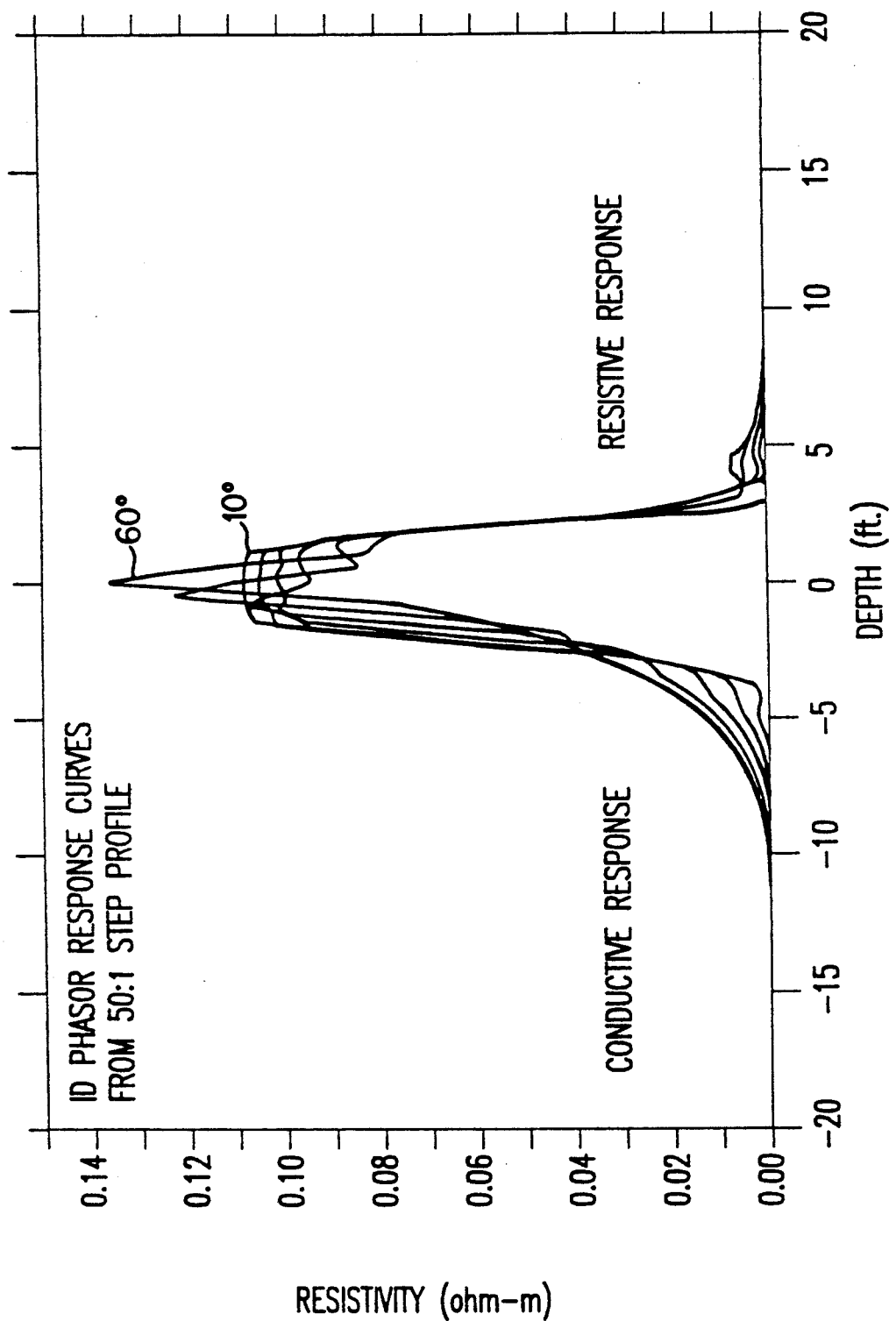
FIG. 8 illustrates response functions derived from the step profile logs of FIG. 7.

In FIG. 8, because the apparent boundary position moves with increasing dip angle, these curves have been shifted so that the centroid of each curve is at the same depth position. At low dip angle, the response is just that of ID Phasor, which is symmetrical. As the dip angle increases, the response becomes more asymmetrical. The left side of the response function produces the shape of the log on the high conductivity side of the boundary. On this side, the response becomes more diffuse. The right side of the response function produces the shape of the log on the low conductivity side of the boundary. On this side, "side lobes" appear with increasing dip. This response shape produces shoulder effect. This is the reason that the resistive bed logs of FIG. 4 develop increasing shoulder effect with increasing dip angle.

Figure 9:
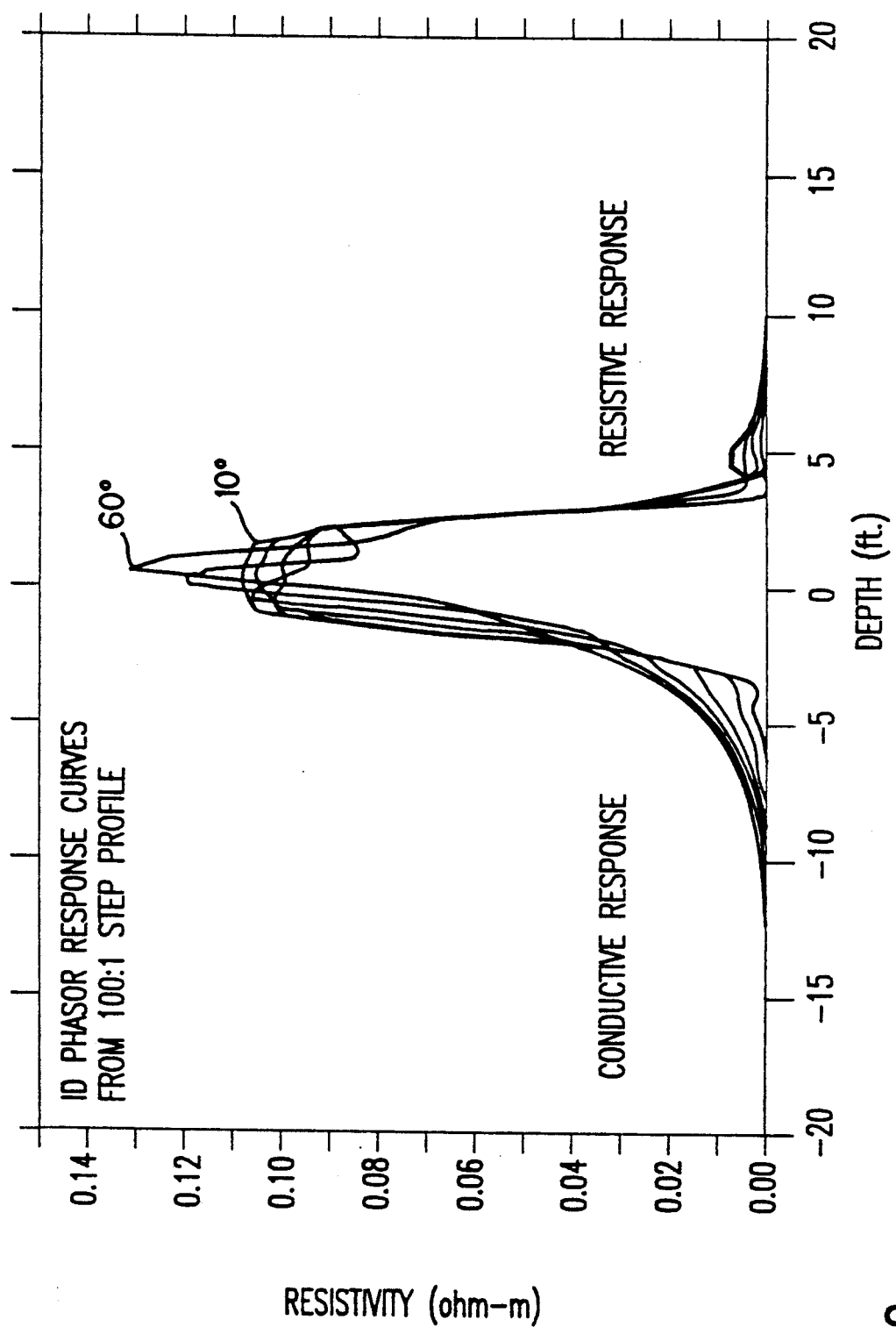
FIG. 9 illustrates Response functions derived from 100:1 contrast step profile logs.

In FIG. 9, the response functions based on a 500 mS/m-5 mS/m step are shown. Note that the shape in the center lobes of the response functions are different from those in FIG. 8, but that the shape in the resistive part of the formation is virtually identical.

From the study of these and other apparent response functions the following sub-effects of dip can be determined:

1. Shoulder effect is increased as a function of dip angle. This is not a strong function of contrast or of background conductivity; and 2. The center of the response function moves from the bed boundary into the conductive layer as dip increases (FIG. 7). This means that a resistive bed will appear thicker as dip angle increases. This effect is also dependent on contrast.

DEVELOPMENT OF THE CORRECTION

The induction response in a dipping bed environment is complicated and requires a new formulation to relate the response to the underlying formation conductivity. As in the case of zero dip, there remains a volumetric term as first predicted by Doll theory. This term, except for skin effect, is linear in formation conductivity, and has been treated extensively in the literature. However, at nonzero dip angles, and when the sonde coils are in close proximity to bed boundaries, there is a new term which is nonlinear in conductivity, and is seen on synthetic logs to produce complicated asymmetrical transitions in the step profile response function (FIGS. 8 and 9) which develop when the bedding planes are not parallel to the planes containing the induction coils. A theory and numerical method to compute this surface charge effect in dipping bed environments, which also may be invaded, has been developed by Chew[8]. This method accounts for TM coupling arising from surface charges deposited by eddy currents passing through bed boundaries. Analysis shows that the interaction at a bed boundary is proportional to the factor $\tan^2(\theta) (\sigma_2-\sigma_1)^2/(\sigma_1+\sigma_2)$, where $\theta$ is the dip angle, and $\sigma_1$ and $\sigma_2$ are the conductivities of the adjacent beds.

From a practical point of view, the nonlinearity is dominant only near the bed boundaries; linear filter theory can thus be used to deconvolve induction logs in a dipping bed environment at the expense of details near the boundaries. This approximation leads to an efficient and reasonable accurate extension to the deconvolution of induction logs into a dipping bed environment.

Construction of an inverse filter is based on the linearity assumption that the measurement $\sigma_m$ is the convolution product of the tool response g(z) with the system to be measured $\sigma_F(z)$ $$\sigma_m(z) = \int_{-\infty}^{\infty} g(z-z')\sigma_F(z')dz', \quad (4)$$

where the z' coordinate represents a position in the formation with respect to a given tool depth z. For Phasor logs, the convolution relationship holds accurately over a wide range of formation conductivities, since the vertical response function g(z) is constructed[7] to be independent of formation conductivity $\sigma_F$. The inverse filter for g(z) is a function h(z) such that $$\sigma_F(z) = \int_{-\infty}^{\infty} h(z-z')\sigma_m(z')dz', \quad (5)$$

where z and z' have the same meaning as in equation (4).

If equation (4) and (5) are combined, the following resulting equation can be solved for the inverse filter h(z):

$$\int_{-\infty}^{\infty} h(z-z')g(z')dz' = \delta(z-z') \quad (5a)$$

Here, $\delta(z-z')$ is the Dirac delta function. If g(z) is well behaved, and its Fourier transform G(k) contains no zeroes, equation (5a) can be solved for the filter coefficients h(z) directly.

To construct an inverse filter, it is important to realize that the spatial frequency content of the measurement which relates to formation conductivity is band limited. The measurement of the formation is through the convolutional response g. In the spatial frequency domain, equation (4) is simply $$\Sigma_m(\lambda) = G(\lambda)\Sigma_F(\lambda) \quad (6)$$

obtained by Fourier transformation of equation (4). In equation (6) capital letters are used to denote Fourier transformed functions. It is not possible or desirable to "solve" the deconvolution problem $$\Sigma_F(\lambda) = H(\lambda)\Sigma_m(\lambda) \quad (7)$$

with the choice $H(\lambda) = 1/G(\lambda)$, since the function $G(\lambda)$ has zeros (blind frequencies) for some induction arrays. Equally troublesome, for all commercial arrays, G is small when spatial frequency $\lambda$ is large, and the result is that inverse filter H will then have the deleterious effect of amplifying noise in the absence of signal.

The correct procedure is to require that the inverse filter $H(\lambda)$ satisfy $H(\lambda)G(\lambda)=1$, for $|\lambda| \leq B$ where B is the bandwidth within which F is nonzero and not too small. Outside this range of $\lambda$, H is smoothly tapered to zero. Details of this relationship between the depth domain and the Fourier transform domain as applied to induction signal processing are well reported in the literature.[9,10]

The function g(z) at a particular dip angle is found by computing a step response log (apparent dip) at that dip angle, converting the raw R- and X-signal logs to the TBT reference frame, then Phasor processing the data. The logs are then differentiated and normalized (FIG. 8) to produce the response function g. Equation (5a) is solved for an inverse filter h(z) while satisfying equation (7) and the subsequent discussion. Thus, this design problem remains within the area of linear filter theory. The application here requires also some criterion for controlling behavior of the sampled and truncated response functions.[11] In this case, the filters are designed using a least squares method.

Figure 10:
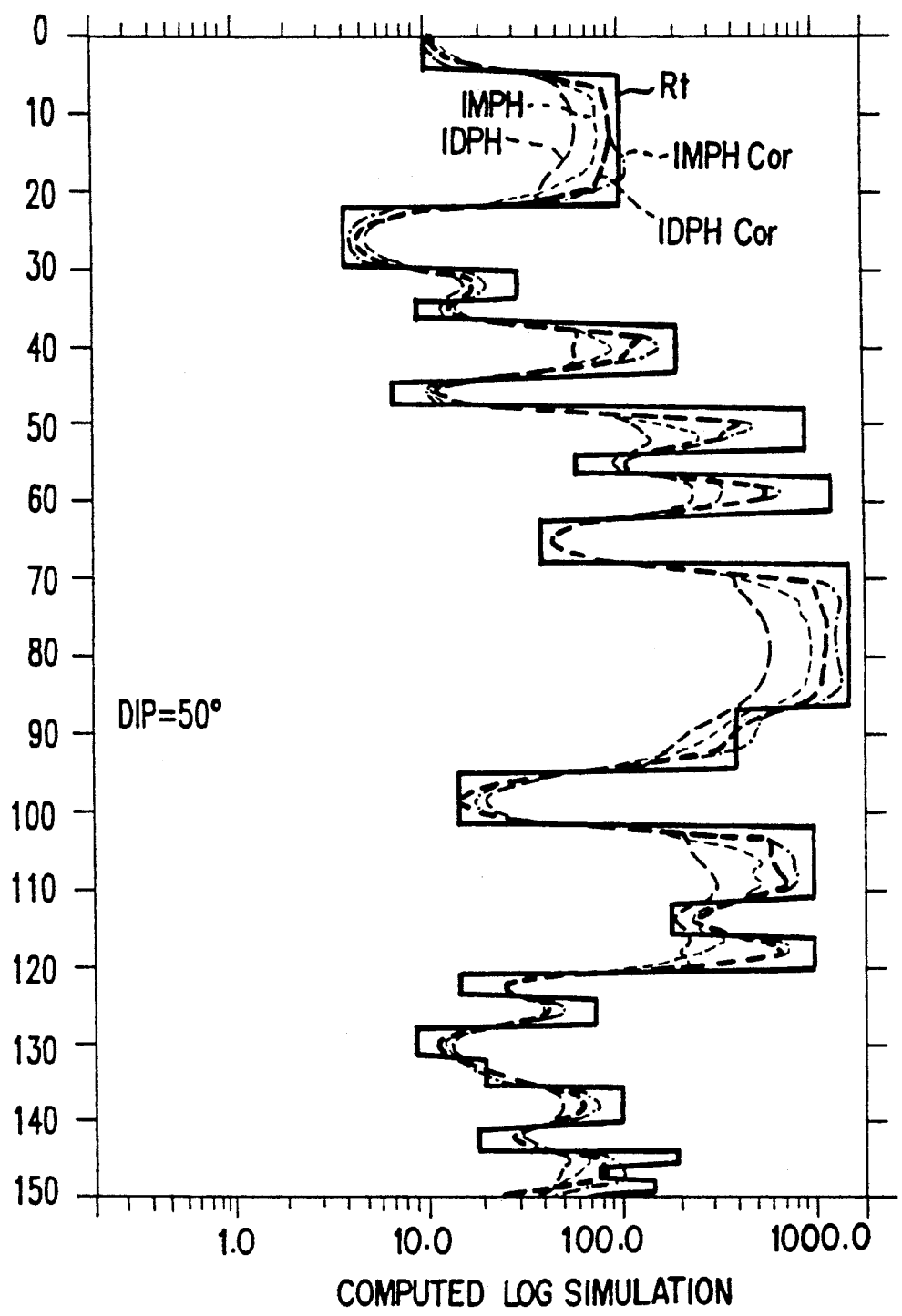
FIG. 10 illustrates a computed log of a multi-layer formation at 50 degree dip showing logs before and after correction.
Figure 11:
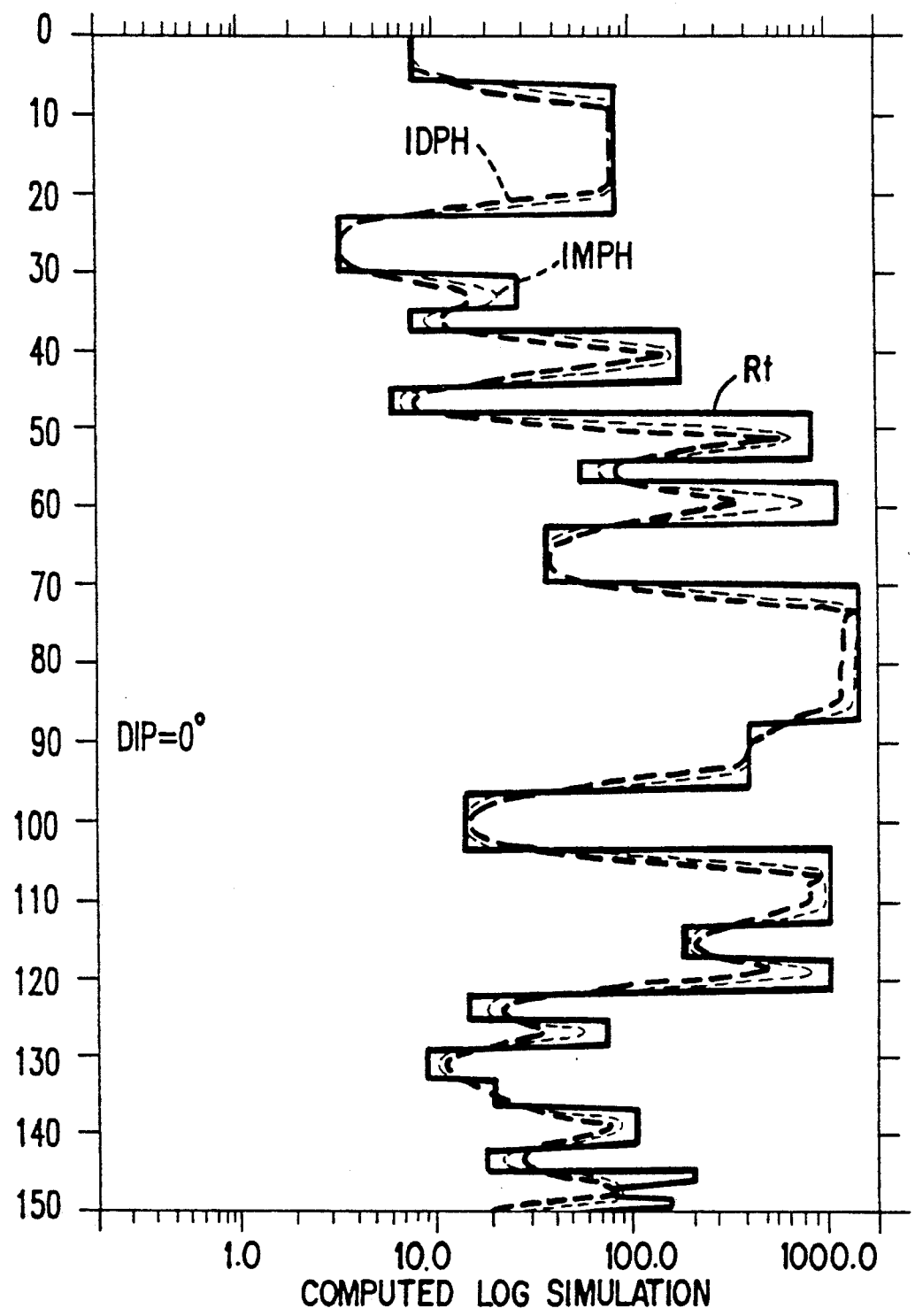
FIG. 11 illustrates the same formation of FIG. 10 computed at zero dip for comparison purposes.

Since the function used for g(z) is derived from a particular type of computed log (a step profile), it is not certain that it will work in any other case. This is a common problem in well log processing, and the only way to solve it is to test the filter in a wide variety of formation profiles. A good starting point is the well-known "Oklahoma formation".[7] The results in this profile, computed at a dip angle of 50°, is shown in FIG. 10. The raw data were converted to the TBT reference frame and then Phasor processed. The resulting conductivity log was filtered with the inverse filter derived from the 50° step profile. The results for ID and IM are compared with the log having no correction. These logs are all in the TBT reference frame (For comparison with field logs, it would be convenient to convert the logs back to the borehole depth reference frame). FIG. 11 shows the same formation at zero dip, which is the standard of reference for the dip correction.

This process described above was repeated for angles of 20°, 30°, 40°, and 60°. Above 70° the effects become both more severe and more non-linear, so this method is limited for the time being to dips below 70°. The algorithm determines the two specified angles nearest the dip angle, and filters the log with those filters. The result is linearly interpolated in dip angle from the two filtered logs. For dip angles less than 10°, the TBT conversion, then Phasor processing, is sufficient.

The process for developing filters for IM is identical as is the basic correction algorithm. In addition to shoulder effect, dip produces on the ILM log an asymmetrical bed boundary response. Phasor processing accentuates the asymmetry. The dip correction filters for IM correct both the shoulder effect and the asymmetry.

Figure 12:
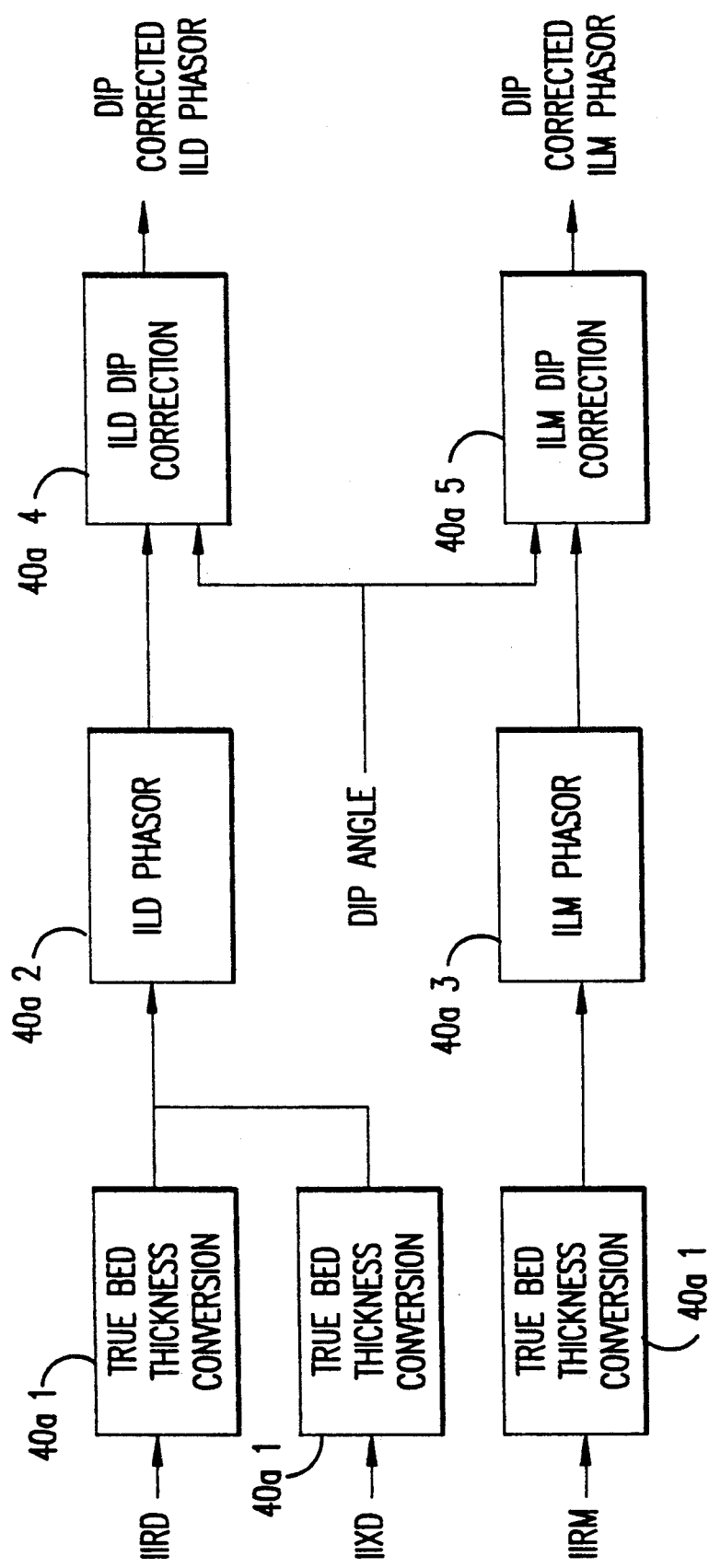
FIG. 12 illustrates a block diagram of a Phasor dip correction algorithm in accordance with the present invention.
Figure 13:
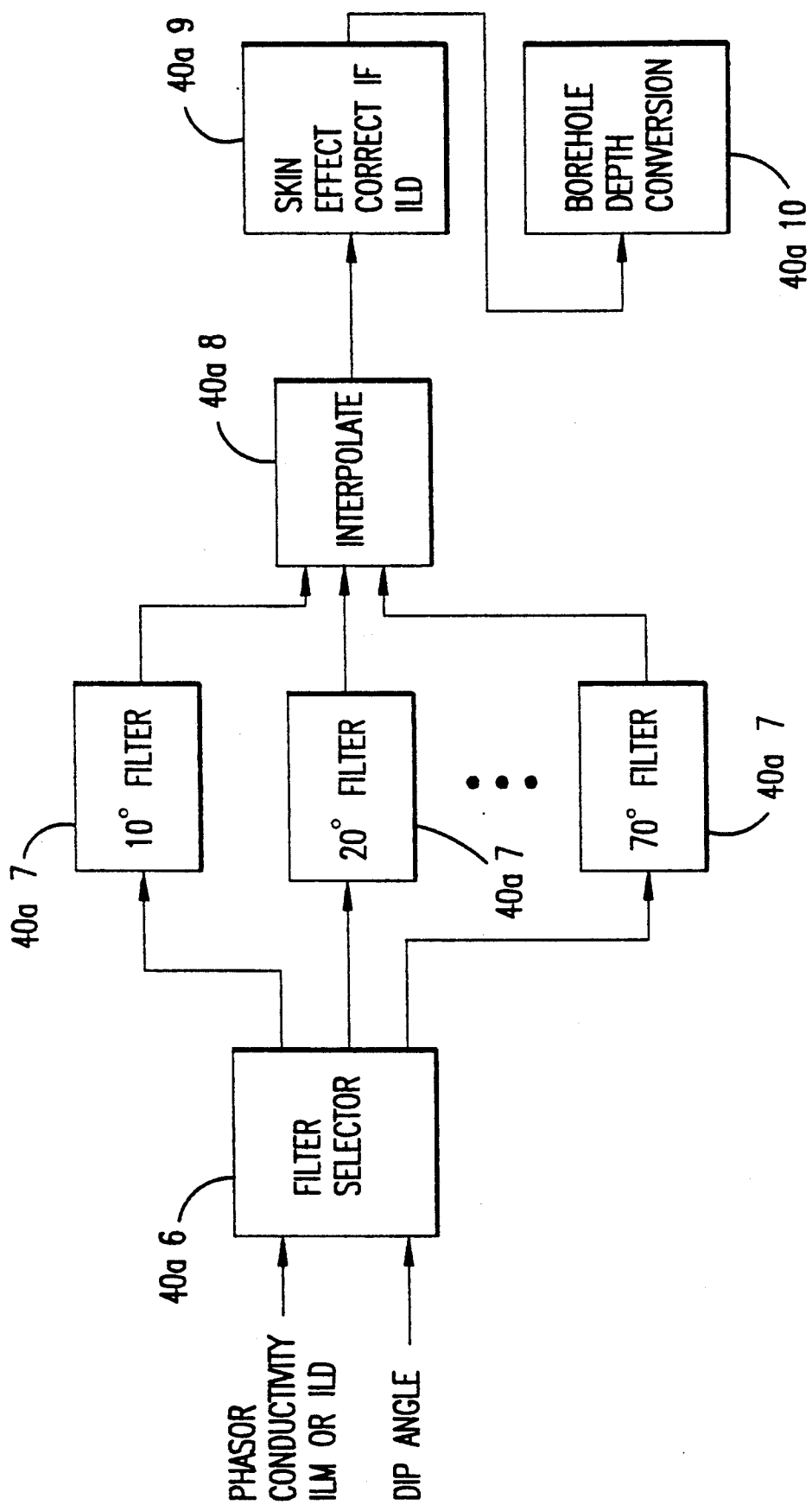
FIG. 13 illustrates details of dip correction block of FIG. 12.

Referring to FIGS. 12-13, a construction of the dip effect correction software 40a of the present invention is illustrated.

In FIGS. 12-13, the explicit algorithm for doing dip correction with filters derived from step-profiles involves several steps. These are:

step (1): Determine an apparent dip angle from dip and deviation using equation (8), the dip and deviation being determined from measurements external to the induction process; and identify the two nearest defined dip angles (a1 and a2) which provide a bound around the apparent dip angle (a1 < apparent dip angle < a2);

step (2): Convert the raw, calibrated induction channel data to True Bed Thickness (TBT) format to remove geometric distortion using equation (10) and resample the converted data on a six-inch interval in TBT mode using equation (11); see block 40a1 of the drawings;

step (3): Process the converted, resampled induction channel data in TBT format using the phasor algorithm set forth in U.S. Pat. No. 4,513,376 to Barber to produce induction deep phasor (IDPH) and induction medium phasor (IMPH) signals $\sigma CDPH_{TBT}$ and $\sigma CMPH_{TBT}$, respectively; see blocks 40a2–40a3;

step (4): Using equation 13, process each of the resulting induction deep phasor (IDPH) and induction medium phasor (IMPH) signals $\sigma CDPH_{TBT}$ and $\sigma CMPH_{TBT}$ of step (3) with two filters h (a1) and h(a2), where filter h(a1) is a function of one of the two nearest defined dip angles a1 of step (1) and filter h (a2) is a function of the other of the two nearest defined dip angles a2 of step (1), to thereby produce two values "sigma$_F$" for each of the signals $\sigma CDPH_{TBT}$ and $\sigma CMPH_{TBT}$, a filter h (a) at a given dip angle 'a' being derived through equation (5a) using a function g (z) derived from equation (B) at the given angle 'a', the two values "sigma$_F$" being formation parameters (such as conductivity) associated with a formation traversed by a borehole at the two nearest defined dip angles; see blocks 40a4–40a7;

step (5): given the two values "sigma$_F$" of step (4) and the two corresponding respective nearest defined dip angles a1 and a2 of step (1), and given the apparent dip angle determined in step (1), interpolate to determine a new value "sigma$_F$" corresponding to the apparent dip angle; see block 40a8;

step (6): Do a "skin effect" correction on the new value "sigma$_F$" of step (5) using equation (21); see block 40a9; and step (7): If required, convert back from TBT format to borehole depth for comparison to field log data; see block 40a10.

Each of these will be described in turn.

DETERMINATION OF APPARENT DIP (Step 1)

If true dip and well deviation are known accurately, the apparent dip can be found. However, if the apparent dip of the major contrast boundaries can be readily determined from a dipmeter or FMS data, that should be used directly. If the dip angle and direction is considered one unit vector, and the deviation angle and direction is considered another, the combination of the two is just the dot product of the two unit vector. Explicitly, if the dip angle is $\theta_1$, and the dip compass direction is $\Phi_1$, and the deviation angle is $\theta_2$ and its compass direction is $\Phi_2$, the resultant apparent dip $\gamma$ is $$\gamma = \cos^{-1}(\sin\theta_1' \cos\phi_1' \sin\theta_2' \cos\phi_2' + \sin\theta_1' \sin\phi_1' \sin\theta_2' \sin\phi_2' + \cos\theta_1' \cos\theta_2') \quad (8)$$

where $$\theta_1' = \theta_1 + 180,$$
$$\phi_1' = 180 - \phi_1,$$
$$\theta_2' = \theta_2,$$
$$\phi_2' = 360 - \phi_2. \quad (9)$$

Equation (9) converts compass directions to polar coordinates and orients the unit vectors downwards.

TRUE BED THICKNESS CONVERSION (Step 2, block 40a1)

Conversion 1 of the raw data from borehole depth to True bed Thickness (TBT) mode is necessary before processing. TBT mode projects the log along a line perpendicular to the bedding planes. If the borehole depth position is z, and the TBT depth is z', then the new TBT depth position is $$z' = z_O + (z - z_O)\cos\gamma \quad (10)$$

where $z_O$ is the position of the center of the zone being corrected.

When projected, the sampling is no longer on a 6 in. interval, but is now on an interval 6 cos $\gamma$ in. long. In order to Phasor process the data, it must be resampled on a 6 in. interval in TBT mode. This is done with the routine which implements a cubic-spline fitting method. This method is designed to combat the "wiggles" that appear in the interpolant with ordinary cubic spline methods due to sudden changes in the data. If we designate the Akima algorithm as $f_A$, then in TBT mode the raw data channels are converted as follows $$\sigma RD_{TBT} = f_A(\sigma IIRD),$$
$$\sigma XD_{TBT} = f_A(\sigma IIXD), \quad (11)$$
$$\sigma RM_{TBT} = f_A(\sigma IIRM).$$

where R indicates a real component of R+iX, X is the imaginary component, D and M indicates the deep and medium receiver array respectively, and $\sigma IIRD$ and $\sigma IIRM$ are the real components and $\sigma IIXD$ is the imaginary component of the conductivity of a formation along an actual depth z at six-inch intervals. In these equations, the input conductivities are indicated by their LIS channel names.

PROCESSING THE DATA (Step 3, Blocks 40a2 and 40a3)

The TBT converted conductivity channels are then processed with the Phasor algorithm set forth in U.S. Pat. No. 4,513,376 to Barber for ILD and ILM, the disclosure of which has already been incorporated herein by reference, to yield the following phasor processed converted conductivities $\sigma CDPH_{TBT}$ and $\sigma CMPH_{TBT}$:

$$\sigma CDPH_{TBT} = P(\sigma RD_{TBT}, \sigma XD_{TBT}), \quad (12)$$
$$\sigma CMPH_{TBT} = P(\sigma RM_{TBT}),$$

where $\sigma CDPH_{TBT}$ is a phasor processed, converted conductivity of a formation for a deep array, $\sigma CMPH_{TBT}$ is the same conductivity for a medium array and P is the Phasor algorithm set forth in the U.S. Pat. No. 4,513,376 referenced above to Barber. The output conductivities are referenced to their equivalent LIS channel names. The Barber Pat. No. 4,513,376 corrects the induction log for shoulder bed effects at zero dip angle.

DIP CORRECTION (Step 4 and 5, Blocks 40a4-40a8)

The apparent dip $\gamma$ is located between two defined filter angles $\alpha$ and $+10$ for $\alpha=20°, 30°, 40°$, or $50°$, and a filter "h" is determined as a function of each of the two defined filter angles using equation (5a). If $\gamma<10°$, no further correction is performed. If $10°\leq\gamma<20°$, the 10° process is just to Phasor process the data using the phasor algorithm set forth in U.S. Pat. No. 4,513,376 to Barber, as described in the previous section of this specification and set forth in APPENDIX A of this specification. At each value of $\alpha\leq 20°$, the data is filtered with the appropriate filter $h(\alpha)$, where $h(\alpha)$ as a function of angle $\alpha$ is derived through equation (5a) as noted below.

The process of equation (5) when applied to a long sequence of sampled conductivity measurements $\sigma$ with a filter h of length N (N odd) samples results in the filtered conductivity sequence [94] F where the j-th sample is $$\sigma_F(j) = \sum_{n=-(N-1)/2}^{(N-1)/2} h_\alpha(n)\, \sigma(j-n) \quad (13)$$

where $\sigma(j-n)$ equals the phasor processed, converted conductivities for deep (D) and medium (M) arrays $\sigma CMPH_{TBT}$ and $\sigma CDPH_{TBT}$ of equation (12), and the filter $h_\alpha$ actually comprises two values (the filter "h" for each of the two nearest defined filter angles), the filter "h" at a given apparent dip angle 'a' being derived through equation (5a) using a function of g(z) as derived from equation (B) at the given angle 'a', where angle 'a' equals two values (the two nearest defined filter angles— alpha and alpha+10).

When the two values of "h" are determined using equation (5a), associated with the two nearest defined filter angles (alpha and alpha+10), given the phasor processed, converted conductivities for deep and medium arrays provided above, using equation (13), two corresponding values of $\sigma_F$ are derived. The actual apparent dip angle of the induction tool in a deviated borehole is disposed between the two nearest defined filter angles (alpha and alpha+10), and an undetermined value of $\sigma_F$ corresponding to the actual apparent dip angle is disposed between the two corresponding values of $\sigma_F$ referenced above; given this information, using an interpolation process, the undetermined value of $\sigma_F$ is then determined, as described below.

The j-th sample of the measured conductivity is aligned with the center of h at n=0. With this representation of the convolution operation, the output and input depths are identical. However, since a sequence of log measurements both above and below "depth" are required, there is a delay of (N−1)/2 samples as the required buffers fill.

Because of the special ways of handling the filtering at low angles and at high angles, the algorithm is specified for four regions depending on angle. The interpolation [8] is as follows

Region 1. $0°\leq\gamma<10°$

The output values in this region are taken directly from equation (12).

Region 2. $10°\leq\gamma<20°$

In this region, the conductivity data from Equation (12) are filtered and interpolated as follows using equation (13):

$$\sigma D.M_{CORR}(j) = b\sigma\, CDPH_{TBT}(j) + \quad (14)$$

$$a \sum_{n=-(n-1)/2}^{(N-1)/2} h_{20}(n)\, \sigma CDPH_{TBT}(j-n),$$

where
$$a = (\gamma - 20)/10, \text{ and} \quad (15)$$
$$b = 1 - a.$$

Region 3. $20°\leq\gamma<60°$

In this region, the conductivity data from Equation (12) are filtered and interpolated as follows using equation (13):

$$\sigma D.M_{CORR}(j) = b \sum_{n=-(N-1)/2}^{(n-1)/2} h_\alpha(n)\sigma CDPH_{TBT}(j-n), \quad (16)$$

$$+a \sum_{n=-(N-1)/2}^{(N-1)/2} h_{\alpha+10}(n)\sigma CDPH_{TBT}(j-n),$$

where
$$a = (\gamma - \alpha)/10, \quad (17)$$
$$b = 1 - a,$$
and
$$\alpha \leq \gamma < \alpha + 10. \quad (18)$$

Region 4. $\gamma = 60°$

At 60°, only the single filter is used, again, using equation (13):

$$\sigma D.M_{CORR}(j) = \sum_{n=-(N-1)/2}^{(N-1)/2} h_\alpha(n)\, \sigma CDPH_{TBT}(j-n). \quad (19)$$

All of the above filters are specific to ILD or ILM at the specified angle.

Figure 14:
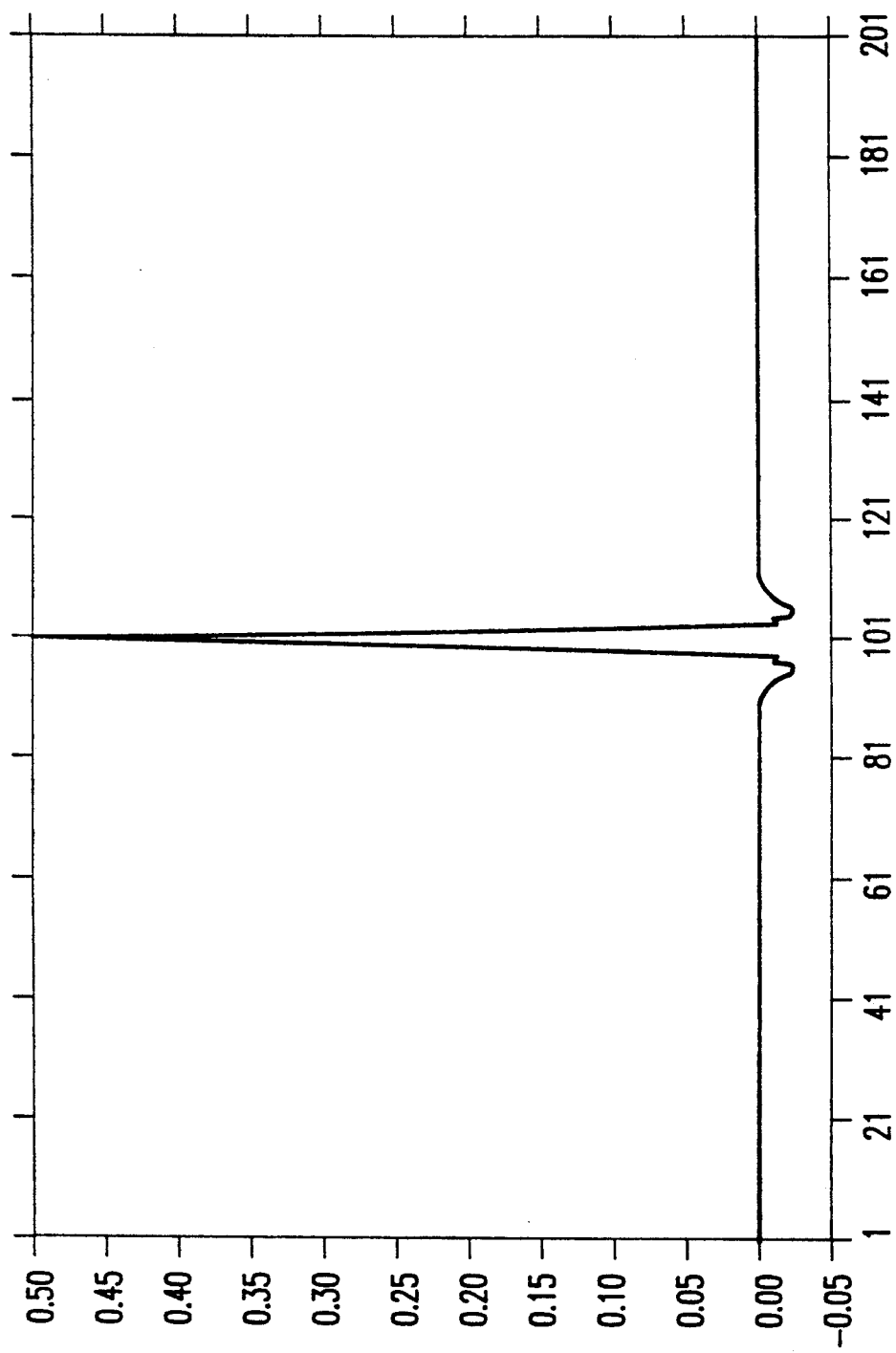
FIG. 14 illustrates dip correction filter coefficients for 50 deg. dip correction.

FIG. 14 shows the ILD filter for 50°.

SKIN EFFECT CORRECTION FOR ILD (Steps 6 and 7, blocks 40a9-40a10.)

Although the increase in apparent shoulder effect is almost linear with conductivity, the algorithm still requires a bit of "touch-up" processing at high conductivity. The additional processing [9] determines the contrast at a bed boundary, and develops a small correction to be added to the results of equation (14), (16) or (19). First: $\sigma D_{CORR}$ from one of these equations is filtered further $$\sigma_{HIGH}(j) = \sum_{n=-(N-1)/2}^{(N-1)/2} h_k(n)\, \sigma_{DCORR}(j-n), \quad (20)$$

where $h_k$ is one filter for $\gamma\leq 50°$ and a different filter for $\gamma>50°$. The filter $h_k$ produces a good log at high contrast. The ratio of the uncorrected to the corrected conductivity is used as a measure of the contrast, and is used to form interpolation coefficients for interpolating between the output of equations (14), (16), or (19) and equation (20). The correction is:

$$\sigma_{DOUT} = b\sigma_{DCORR} + a\sigma_{DHIGH}. \quad (21)$$

-continued where $$a = \ln\left(\frac{\sigma_{CDPHTBT}}{3\sigma_{DCORR}}\right);$$

$$b = 1 - a$$

No corrections beyond equations (14), (16), or (19) are required for ILM.

Figure 13A:
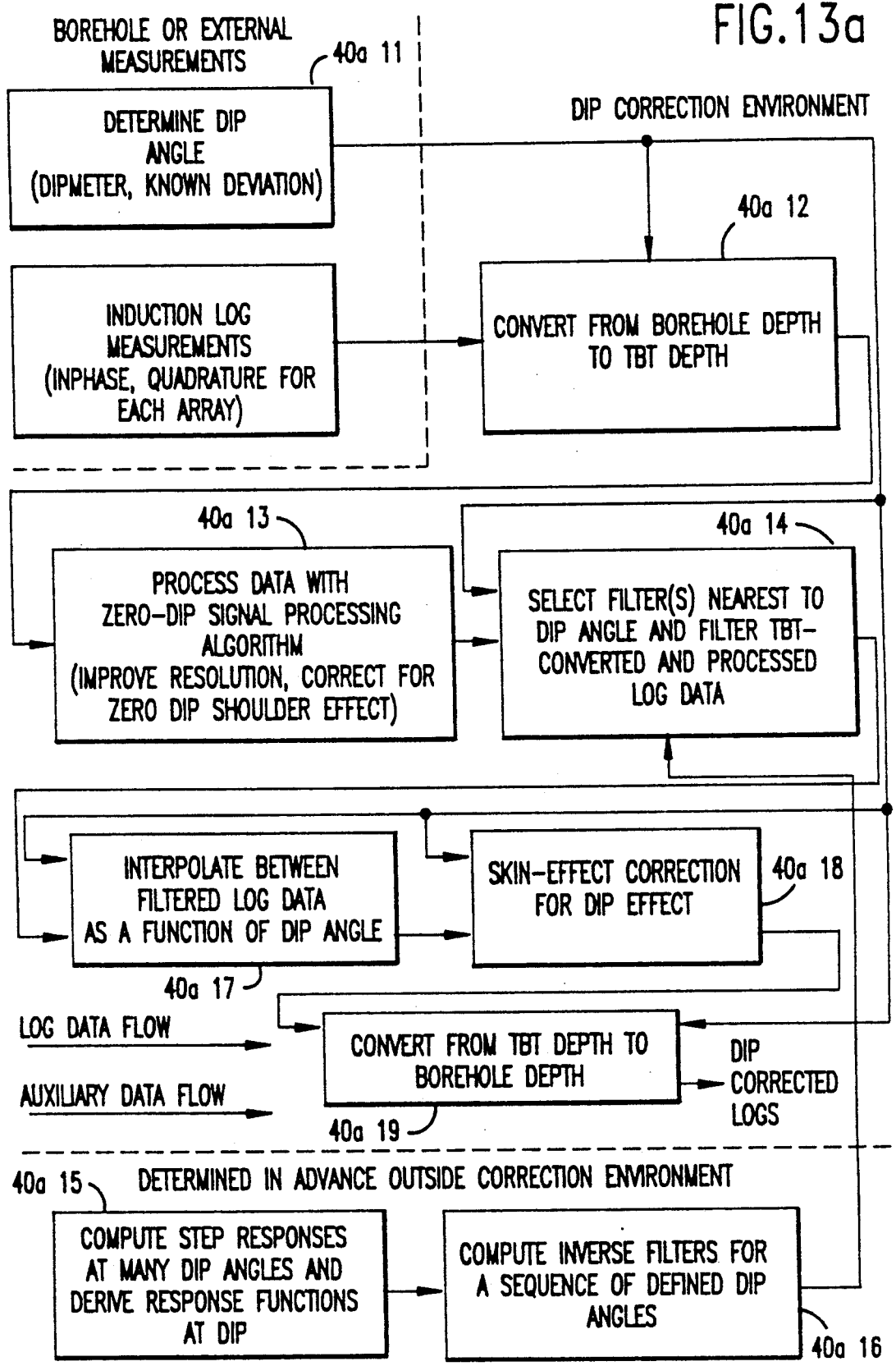
FIG. 13a illustrates another block diagram of the dip correction algorithm in accordance with the present invention.

Referring to FIG. 13a, another, more succinct block diagram of the dip effect correction software 40a of FIGS. 12-13 is illustrated.

In FIG. 13a, the dip effect correction software 40a is shown more succinctly in block diagram form. The dip effect correction software begins by determining apparent dip angle, block 40a11. Formation profile data, developed by an induction tool during induction log measurements when the tool is disposed in a deviated borehole, is then converted to true bed thickness (TBT) format, block 40a12. The TBT converted data is then processed and corrected to reduce shoulder bed effects at approximately zero dip angle, block 40a13. Filters h(a1) and h(a2) are then determined as a function of two angles a1 and a2, where the two angles are related to the apparent dip angle by the following expression: a1 < apparent dip angle < a2, block 40a14. The two filters h(a1) and h(a2) are determined as a function of their angles a1 and a2 in accordance with equation (5b) set forth above in this specification, equation (5a) including the Dirac delta function, the Dirac delta function being represented by blocks 40a15 and 40a16. The TBT-converted and processed log data is then filtered thereby determining two values "sigma$_F$(a1) and sigma$_F$(a2)" as a function of the two filters h(a1) and h(a2), block 40a14. A value "sigma$_F$" as a function of apparent dip angle is then determined by interpolating between the two values of sigma "sigma$_F$(a1) and sigma$_F$(a2)", the two angles a1 and a2, and the apparent dip angle, block 40a17. A skin effect correction is performed on the value "sigma$_F$", block 40a18. Finally, following the skin effect correction, the value "sigma$_F$" is converted back from TBT format to borehole depth, block 40a19. Dip corrected logs are the result.

The following nomenclature was used in this analysis:

| | |
|---|---|
| g | Induction response function |
| G | Fourier transform of g |
| h | Linear FIR filter weights |
| H | Fourier transform of h |
| ID | Deep induction array |
| IDPH | ID Phasor resistivity log (ohm-m) |
| ILD | ID Traditional resistivity log (ohm-m) |
| IM | Medium induction array |
| IMPH | IM Phasor resistivity log (ohm-m) |
| ILM | IM Traditional resistivity log (ohm-m) |
| $R_m$ | Resistivity of the borehole fluid (ohm-m) |
| $R_t$ | Resistivity of the virgin zone (ohm-m) |
| $R_{xo}$ | Resistivity of the flushed zone (ohm-m) |
| SFL | Spherically Focussed Log |
| TBT | True bed thickness reference frame |
| $\lambda$ | Spatial Frequency (cycles/ft) |
| $\theta$ | Dip angle |
| $\sigma$ | Conductivity (mS/m) |
| $\sigma_m$ | Measured conductivity (Eq. 1) (mS/m) |
| $\sigma_F$ | Formation conductivity (Eq. 2) (mS/m) |
| $\Sigma$ | Fourier transformed conductivity |

References 1-12 were cited in this specification. References 1-6 are incorporated by reference into this specification. References 7-12 are set forth below in their entirety in APPENDIX C through APPENDIX H, respectively.

1. Hardman, R. H., and Shen, L. C., "Theory of Induction Sonde in Dipping Beds," Geophysics, 51, No. 3 (1986), pp. 800-809.
2. Anderson, B., Safinya, K. A., and Habashy, T., ""Effects of Dipping Beds on the Response of Induction Tools," presented at SPE 61st Annual Technical Conference, New Orleans (October, 1986), Paper SPE 15488.
3. Anderson, B., and Barber, T., "Strange Induction Logs-A Catalog of Environmental Effects," The Log Analyst, 29, no. 4 (1988), pp. 229-243.
4. Howell, E. P., and Fisher, T. E., "Induction Log Deconvolution for Deviated Boreholes", presented at SPWLA 23rd Annual Logging Symposium, Jul. 6-9, 1982, Paper H.
5. Fylling, A., and Spurlin, J., "Induction Stimulation, The Log Analysts' Perspective", presented at 11th European Formation Evaluation Symposium, Sept. 14-16, 1988 Paper T.
6. Anderson, B., Barber, T., Singer, J., and Broussard, T., "ELMOD-Putting Electromagnetic Modeling to Work to Improve Resistivity Log Interpretation," presented at 30th Annual SPWLA Logging Symposium, Jun. 11-14, 1989, Denver, Paper M.
7. Barber, T., "Introduction to the Phasor Dual Induction Tool," JPT, Sept., 1985, 1699-1706. See APPENDIX C below wherein this entire article is duplicated in its entirety.
8. Howard, A. Q., and W. C. Chew, "Induction Response in Dipping Beds with Invasion", presented at 1989 IEEE IGARSS meeting, Vancouver, Canada, 10-14 Jul., 1989. See APPENDIX D below wherein this entire article is duplicated in its entirety.
9. George, C. F., et al., "Application of Inverse Filters to Induction Log Analysis," Geophysics, Feb. 1964. See APPENDIX E below wherein this entire article is duplicated in its entirety.
10. Barber, T., "Induction Log Vertical Resolution Enhancement-Physics and Limitations", presented at SPWLA 29th Annual Logging Symposium, Jun. 5-8, 1988, San Antonio, Paper O. See APPENDIX F below wherein this entire article is duplicated in its entirety.
11. Merchant, G. A., and Parks, T. W., "Inverse Filtering for Systems with Unit Circle Zeroes", presented at IEEE Conference on Acoustics, Speech, and Signal Processing, Atlanta, Ga., Mar. 30-Apr. 1, 1981. See APPENDIX G below wherein this entire article is duplicated in its entirety.
12. Gianzero, S., and Anderson, B., "A New Look At Skin Effect", The Log Analyst, vol. XXIII, No. 1, pages 20-34. See APPENDIX H below wherein this entire article is duplicated in its entirety.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method for correcting an induction log for dip effect and developing an output signal reflecting the correction, the induction log being an input signal representing a plurality of formation profile data developed by an induction tool when said induction tool is disposed in a deviated borehole, said deviated borehole traversing a formation which includes a plurality of bedding planes, comprising the steps of:

(a) determining an apparent dip angle representing an angle between a longitudinal axis of said deviated borehole and an axis perpendicular to said bedding planes;

(b) converting said data developed by said induction tool when said tool is disposed in said deviated borehole to true bed thickness (TBT) format thereby producing TBT converted data;

(c) processing and correcting the TBT converted data to reduce shoulder bed effects at approximately zero dip angle thereby producing processed, converted data;

(d) determining two filters h(a1) and h(a2) as a function of two angles a1 and a2, where said two angles are related to said apparent dip angle as follows, a1 < said apparent dip angle < a2, said two filters h(a1) and h(a2) each being determined as a function of their angles a1 and a2 in accordance with the following expression, $$\int_{-\infty}^{\infty} h(z - z')g(z')dz' = \delta(z - z')$$

where $\delta(z-z')$ is the Dirac delta function and g(z) is determined in accordance with the following expression, $$g(z) = a \frac{d\sigma_m}{dz},$$

(e) determining two values "sigma$_F$(a1) and sigma$_F$(a2)" as a function of said two filters h(a1) and h(a2), respectively, and as a function of said processed, converted data of step (c) in accordance with the following expression, where said two values are parameters representing said formation profile data at angles a1 and a2, $$\sigma_F(j) = \sum_{n=-(N-1)/2}^{(N-1)/2} h_a(n)\,\sigma(j-n)$$

(f) interpolating to determine a value "sigma$_F$" as a function of said apparent dip angle representing a parameter of said formation at said apparent dip angle using said two values of step (e), said two angles, and said apparent dip angle of step (d), said value "sigma$_F$" being said output signal.

2. The method of claim 1, further comprising the step of:

(g) performing a skin effect correction on the value of step (f) using the following expression:

$$\sigma_{HIGH}(j) = \sum_{n=-(N-1)/2}^{(N-1)/2} h_k(n)\,\sigma_{DCORR}(j-n).$$

where sigma$_{D\ CORR}$ (j−n) is said value of step (f), and where $$\sigma_{DOUT} = b\sigma_{DCORR} + a\sigma_{DHIGH}.$$

$$a = \ln\left(\frac{\sigma_{CDPHTBT}}{3\sigma_{DCORR}}\right);$$

$$b = 1 - a$$

3. The method of claim 2, further comprising the step of:

(h) converting back from said true bed thickness format to a format associated with said data developed by said induction tool.

4. An apparatus for correcting an induction log for dip effect and developing an output signal reflecting the correction, the induction log being an input signal representing a plurality of formation profile data developed by an induction tool when said induction tool is disposed in a deviated borehole, said deviated borehole traversing a formation which includes a plurality of bedding planes, comprising:

means for determining an apparent dip angle representing an angle between a longitudinal axis of said deviated borehole and an axis perpendicular to said bedding planes;

means for converting said data developed by said induction tool when said tool is disposed in said deviated borehole to true bed thickness (TBT) format thereby producing TBT converted data;

means for processing and correcting the TBT converted data to reduce shoulder bed effects at approximately zero dip angle thereby producing processed, converted data;

means for determining two filters h(a1) and h(a2) as a function of two angles a1 and a2, where said two angles are related to said apparent dip angle as follows, a1 < said apparent dip angle < a2, said two filters h(a1) and h(a2) each being determined as a function of their angles a1 and a2 in accordance with the following expression, $$\int_{-\infty}^{\infty} h(z - z')g(z')dz' = \delta(z - z')$$

where $\delta(z-z')$ is the Dirac delta function and g(z) is determined in accordance with the following expression, $$g(z) = a \frac{d\sigma_m}{dz},$$

means for determining two values "sigma$_F$(a1) and sigma$_F$(a2)" as a function of said two filters h(a1) and h(a2), respectively, and as a function of said processed, converted data in accordance with the following expression, where said two values are parameters representing said formation profile data at angles a1 and a2, $$\sigma_F(j) = \sum_{n=-(N-1)/2}^{(N-1)/2} h_a(n)\,\sigma(j-n)$$

means for interpolating to determine a value "sigma$_F$" as a function of said apparent dip angle representing a parameter of said formation at said apparent dip angle using said two values, said two angles, and said apparent dip angle, said value "sigma$_F$" being said output signal.

5. The apparatus of claim 4, further comprising:
means for performing a skin effect correction on said value "sigma$_F$" using the following expression:

$$\sigma_{HIGH}(j) = \sum_{n=-(N-1)/2}^{(N-1)/2} h_k(n) \, \sigma_{DCORR}(j-n),$$

where sigma$_{D\ CORR}$(j−n) is said value "sigma$_F$", and where $$\sigma_{DOUT} = b\sigma_{DCORR} + a\sigma_{DHIGH}.$$

$$a = \ln\left(\frac{\sigma_{CDPHTBT}}{3\sigma_{DCORR}}\right);$$

$$b = 1 - a$$

6. The apparatus of claim 5, further comprising:
means for converting back from said true bed thickness format to a format associated with said data developed by said induction tool.

7. The method of claim 1, further comprising the step of:
recording said output signal on an output record medium.

8. The apparatus of claim 4, further comprising:
means for recording said output signal on an output record medium.

9. The method of claim 1, further comprising the step of:
converting back from said true bed thickness format to a format associated with said data developed by said induction tool.

10. The method of claim 1, further comprising the step of:
performing a skin effect correction on the value of step (f) using the following expression and generating a new output signal, $$\sigma_{HIGH}(j) = \sum_{n=-(N-1)/2}^{(N-1)/2} h_k(n) \, \sigma_{DCORR}(j-n),$$

where sigma$_{D\ CORR}$(j−n) is said value of step (f), and where $$\sigma_{DOUT} = b\sigma_{DCORR} + a\sigma_{DHIGH}.$$

$$a = \ln\left(\frac{\sigma_{CDPHTBT}}{3\sigma_{DCORR}}\right);$$

and $$b = 1 - a$$

recording said new output signal on an output record medium.

11. The method of claim 1, further comprising the steps of:
performing a skin effect correction on the value of step (f) using the following expression, $$\sigma_{HIGH}(j) = \sum_{n=-(N-1)/2}^{(N-1)/2} h_k(n) \, \sigma_{DCORR}(j-n).$$

where sigma$_{D\ CORR}$(j−n) is said value of step (f), and where $$\sigma_{DOUT} = b\sigma_{DCORR} + a\sigma_{DHIGH}.$$

$$a = \ln\left(\frac{\sigma_{CDPHTBT}}{3\sigma_{DCORR}}\right);$$

$$b = 1 - a$$

converting back from said true bed thickness format to a format associated with said data developed by said induction tool thereby generating a new output signal; and
recording said new output signal on an output record medium.

12. The apparatus of claim 4, further comprising:
means for converting back from said true bed thickness format to a format associated with said data developed by said induction tool.

13. The apparatus of claim 4, further comprising:
means for performing a skin effect correction on said value "sigma$_F$" using the following expression and generating a new output signal, $$\sigma_{HIGH}(j) = \sum_{n=-(N-1)/2}^{(N-1)/2} h_k(n) \, \sigma_{DCORR}(j-n),$$

where sigma$_{D\ CORR}$(j−n) is said value "sigma$_F$", and where $$\sigma_{DOUT} = b\sigma_{DCORR} + a\sigma_{DHIGH}.$$

$$a = \ln\left(\frac{\sigma_{CDPHTBT}}{3\sigma_{DCORR}}\right);$$

$$b = 1 - a$$

and
means for recording said new output signal on said output record medium.

14. The apparatus of claim 4, further comprising:
means for performing a skin effect correction on said value "sigma$_F$" using the following expression:

$$\sigma_{HIGH}(j) = \sum_{n=-(N-1)/2}^{(N-1)/2} h_k(n) \, \sigma_{DCORR}(j-n),$$

where sigma$_{D\ CORR}$(j−n) is said value "sigma$_F$", and where $$\sigma_{DOUT} = b\sigma_{DCORR} + a\sigma_{DHIGH}.$$

$$a = \ln\left(\frac{\sigma_{CDPHTBT}}{3\sigma_{DCORR}}\right);$$

$$b = 1 - a$$

means for converting back from said true bed thickness format to a format associated with said data developed by said induction tool and generating a new output signal; and
means for recording said new output signal on an output record medium.

* * * * *